United States Patent [19]
Cho

[11] Patent Number: 5,381,270
[45] Date of Patent: Jan. 10, 1995

[54] COMPACT ZOOM LENS SYSTEM

[75] Inventor: Michio Cho, Saitama, Japan

[73] Assignee: Fuji Photo Film Co., Ltd., Kanagawa, Japan

[21] Appl. No.: 79,740

[22] Filed: Jun. 22, 1993

[30] Foreign Application Priority Data

Jun. 22, 1992 [JP] Japan .................................. 4-162964

[51] Int. Cl.$^6$ ............................................ G02B 15/14
[52] U.S. Cl. ............................................ 359/692
[58] Field of Search ........................................ 359/692

[56] References Cited
FOREIGN PATENT DOCUMENTS 56-128911 10/1981 Japan .
63-161422 7/1988 Japan .
2-284109 11/1990 Japan .
4152315 5/1992 Japan .................................. 359/692

*Primary Examiner*—Loha Ben
*Assistant Examiner*—Michael A. Papalas
*Attorney, Agent, or Firm*—Young & Thompson

[57] ABSTRACT

A zoom lens system consists of a forward lens groups of a positive power comprising first to fourth lens groups and a rearward lens group of a negative power comprising fifth to seventh lens groups, and satisfies the following conditions:

$1.40 < f_w/f_F < 2.0$
$N_p < N_n$
$-0.45 < f_{67}/f_w < -0.1$
$0.5 < f_6/f_7 < 0.8$
$-3 < (f_{12} \times f_{34})/f_F^2 < 0.5$ wherein $f_w$ is the focal length of the zoom lens system in the wide-angle mode, $f_F$ is the focal length of the forward lens groups, $N_p$ is the refractive index of a convex lens of the third lens group, $N_n$ is the refractive index of a concave lens of the third lens group, $f_{67}$ is the resultant focal length of the sixth and seventh lens groups, $f_6$ is the focal length of the sixth lens group, $f_7$ is the focal length of the seventh lens group, $f_{12}$ is the resultant focal length of the first and second lens groups, and $f_{34}$ is the resultant focal length of the third and fourth lens groups. Spherical aberration, astigmatism and distortion are well corrected in all zooming modes.

4 Claims, 29 Drawing Sheets

SPHERICAL ABERRATION (mm)

ASTIGMATISM (mm)

DISTORTION (%)

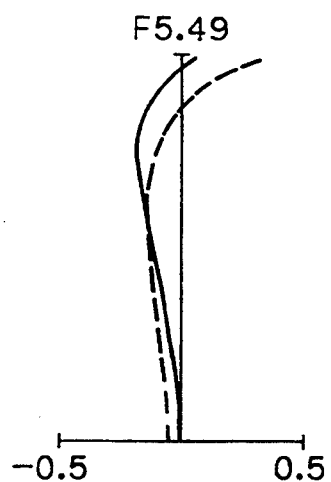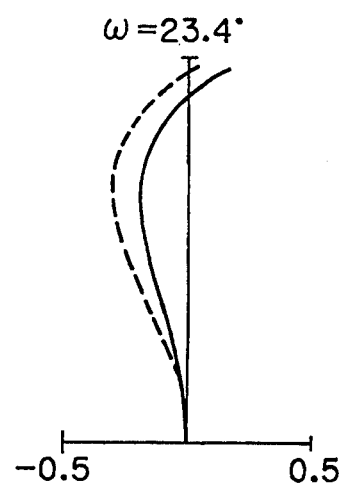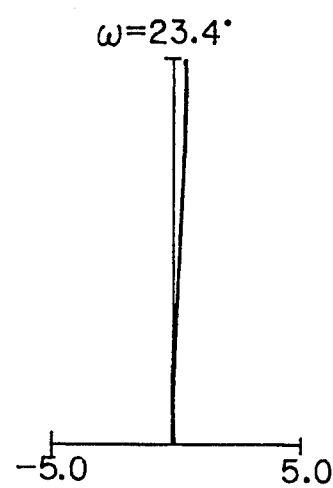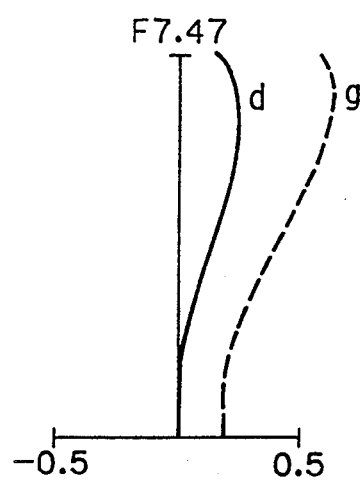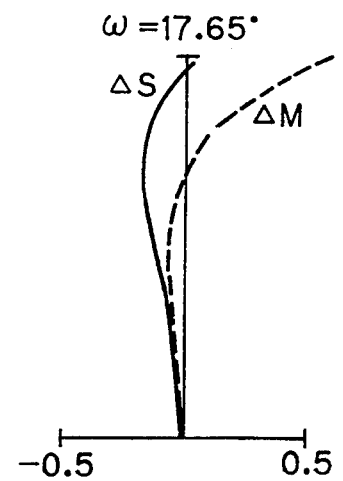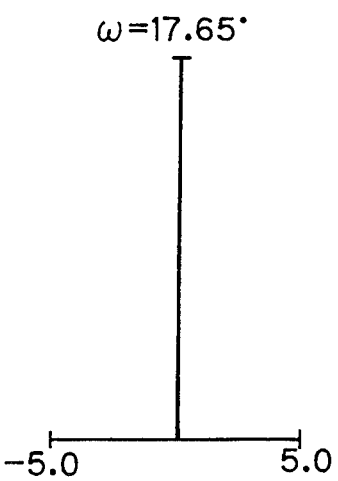

FIG. 5
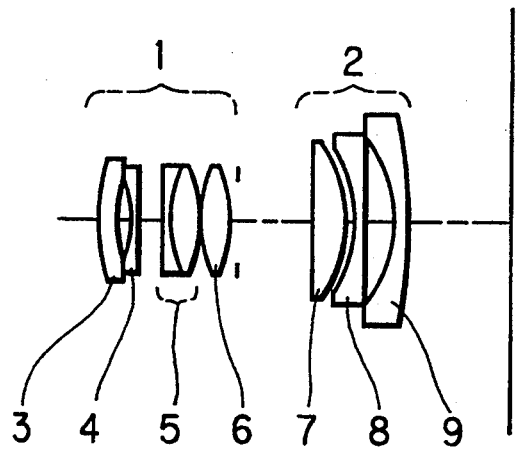
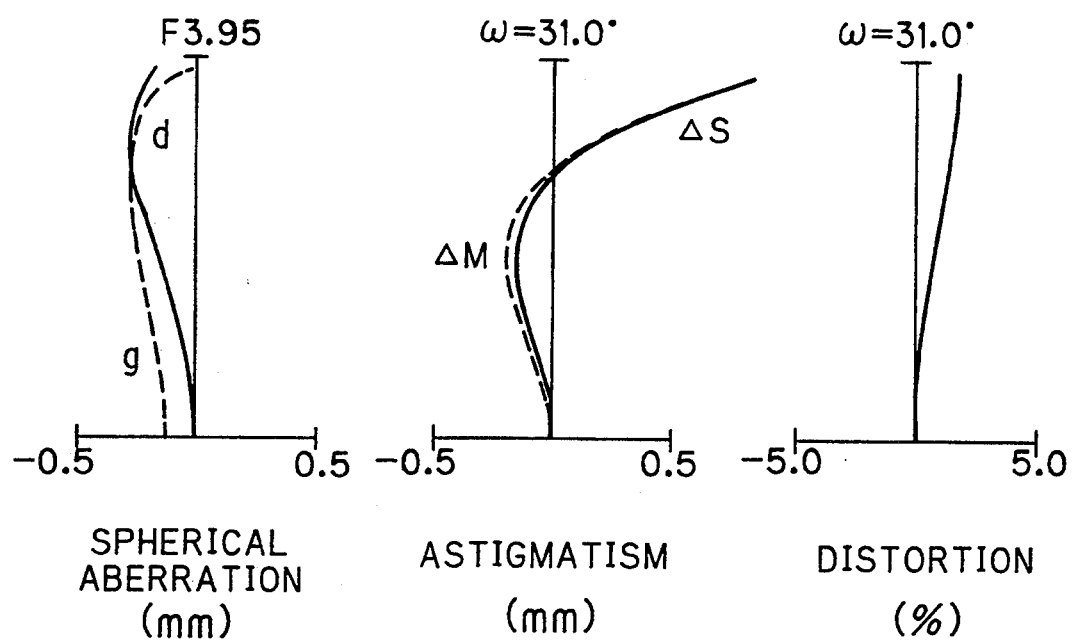
FIG. 6A
FIG. 6B
FIG. 6C
SPHERICAL ABERRATION (mm)
ASTIGMATISM (mm)
DISTORTION (%)

FIG. 7A  FIG. 7B  FIG. 7C
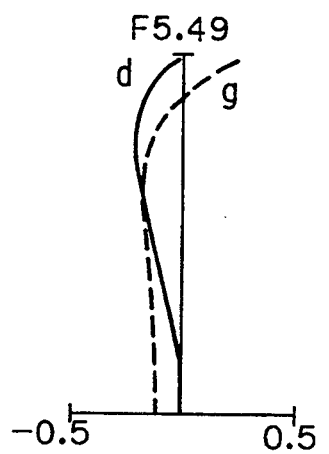
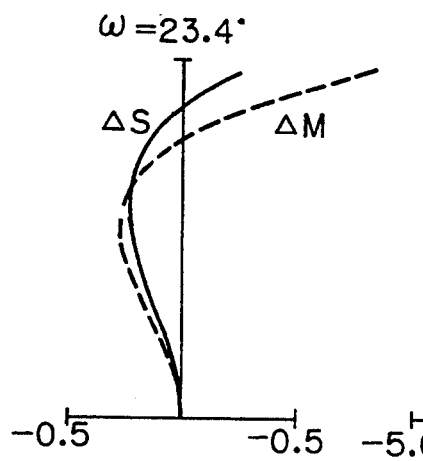
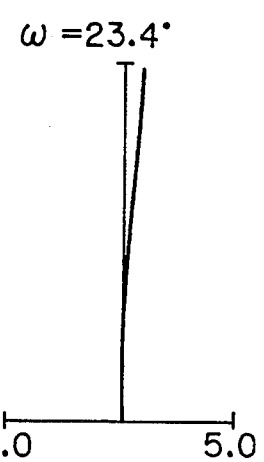
SPHERICAL ABERRATION (mm)   ASTIGMATISM (mm)   DISTORTION (%)
FIG. 8A  FIG. 8B  FIG. 8C
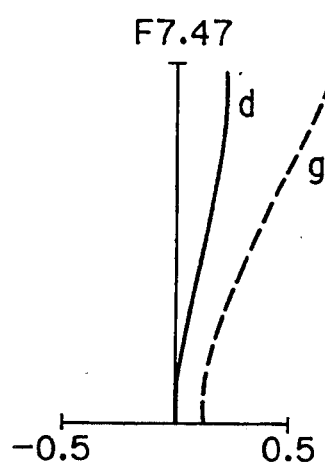
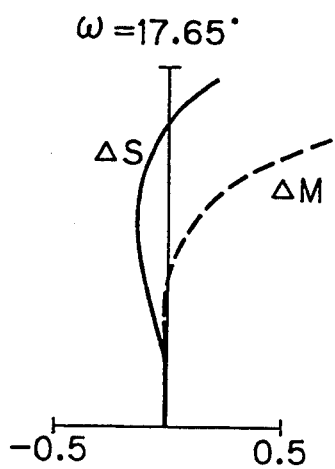
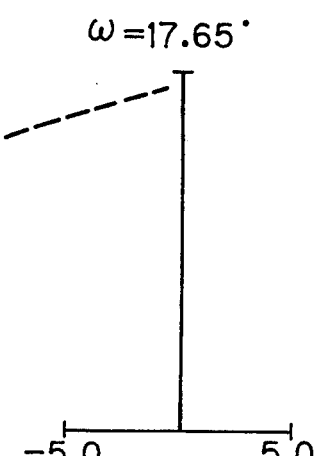
SPHERICAL ABERRATION (mm)   ASTIGMATISM (mm)   DISTORTION (%)

FIG. 9
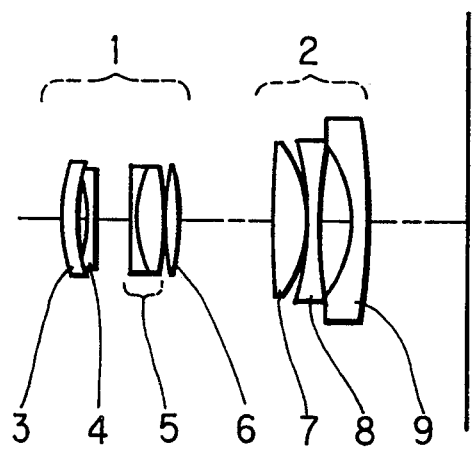
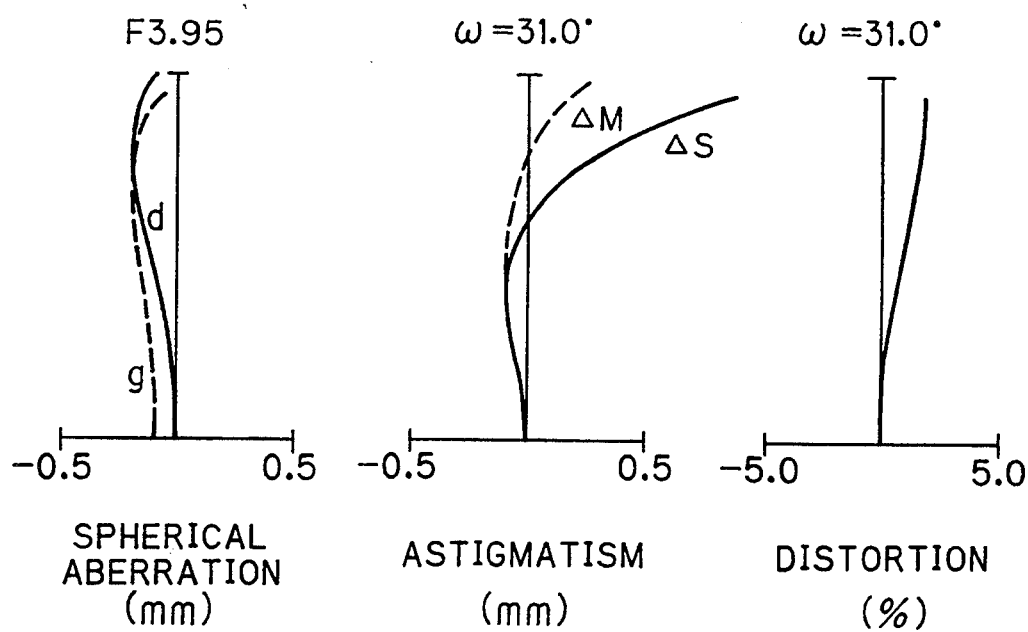
FIG. 10A     FIG. 10B     FIG. 10C

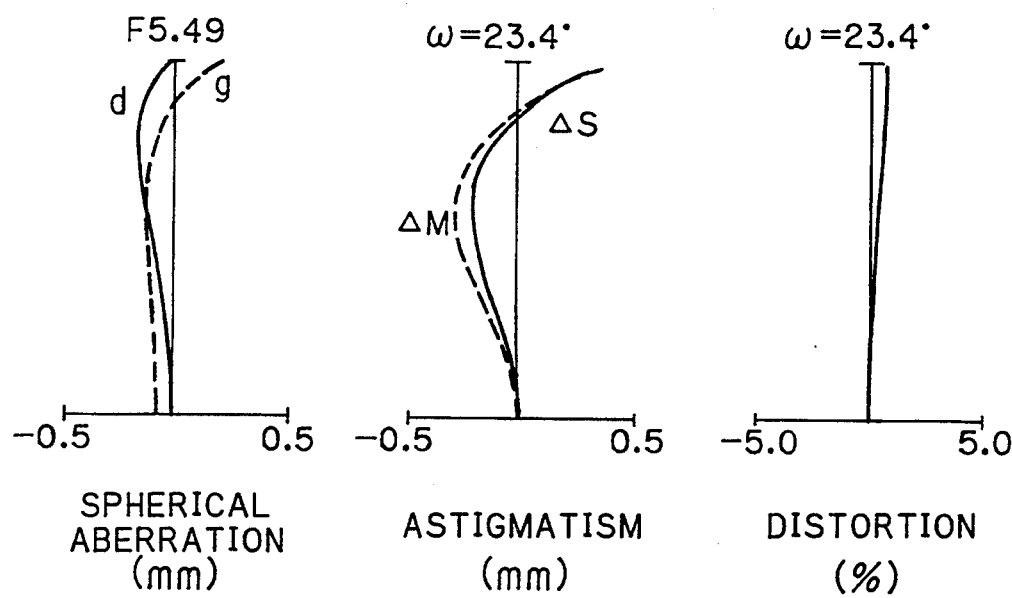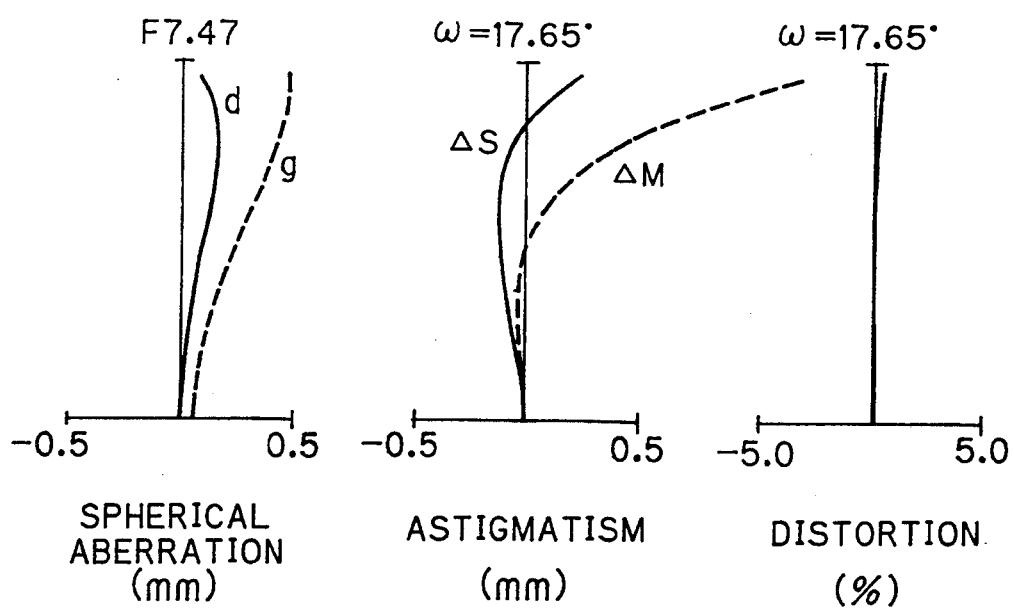

FIG. 13
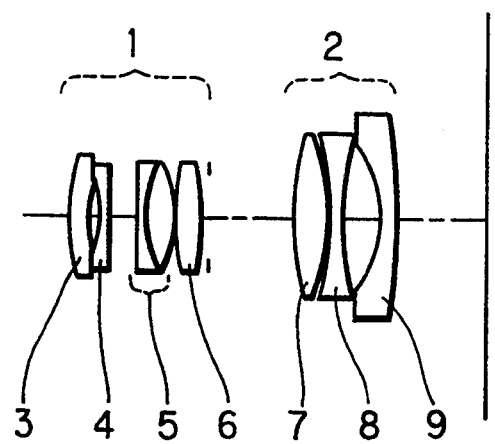
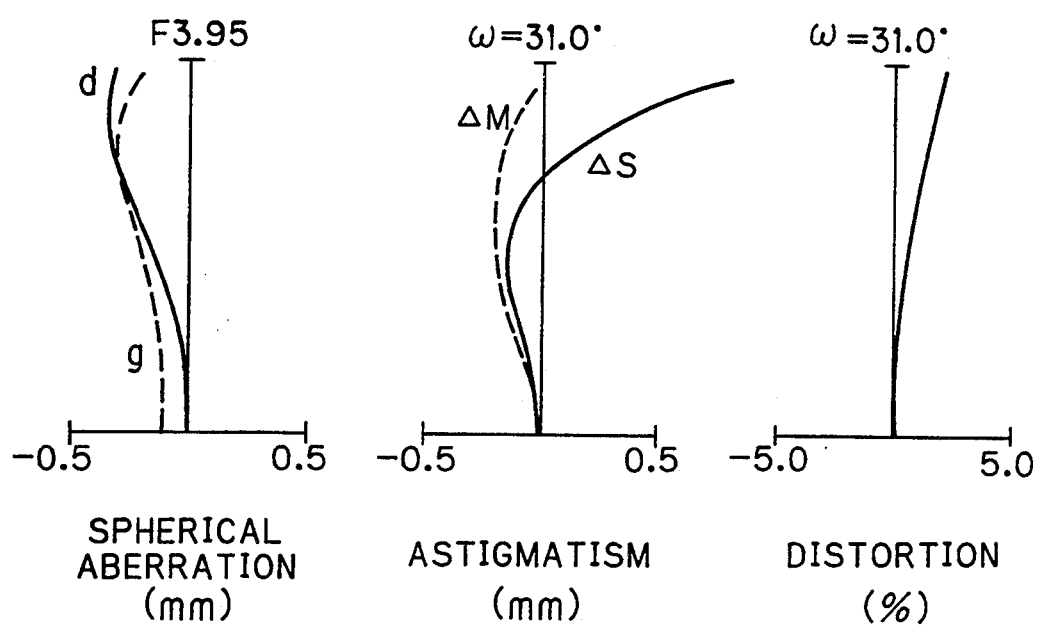
FIG. 14A  FIG. 14B  FIG. 14C

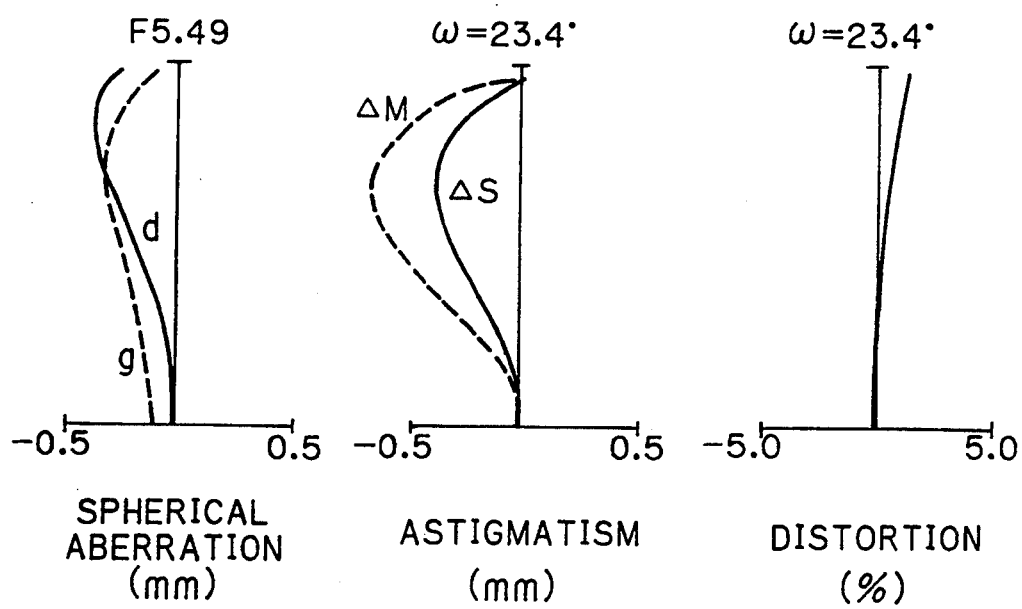
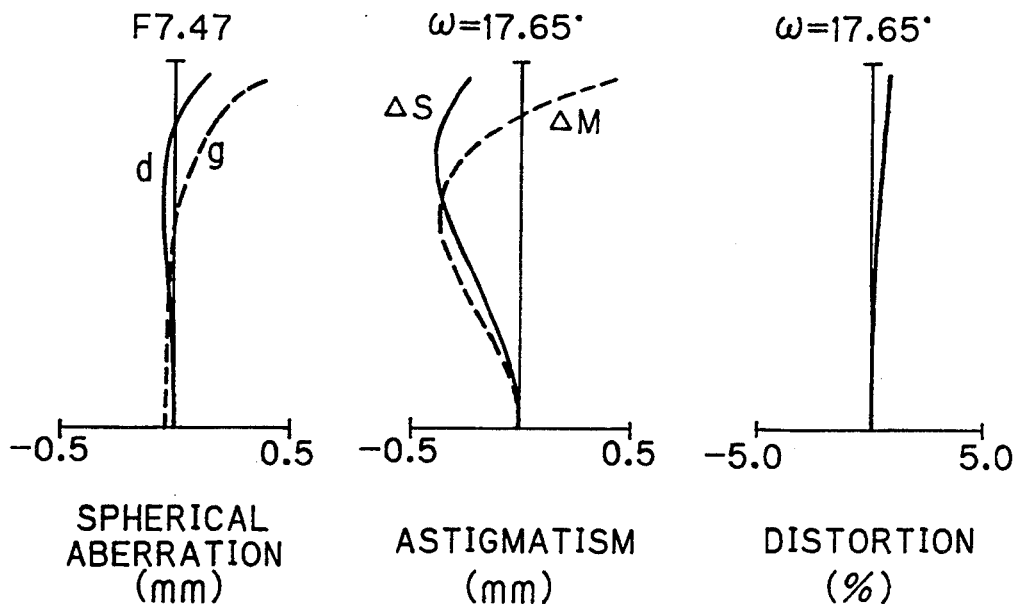

FIG. 17
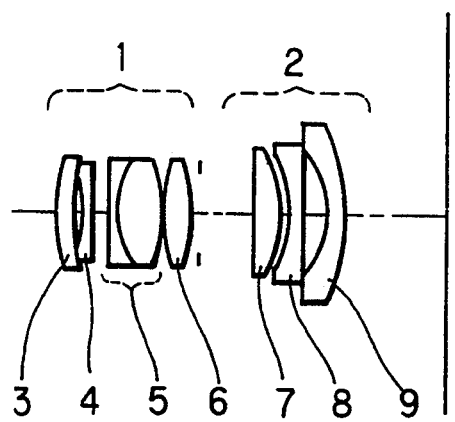
FIG. 18A  FIG. 18B  FIG. 18C
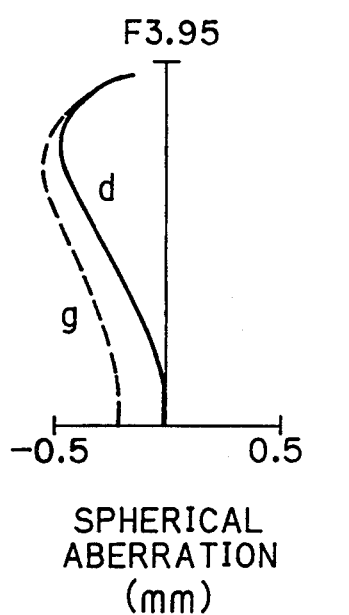
SPHERICAL
ABERRATION
(mm)
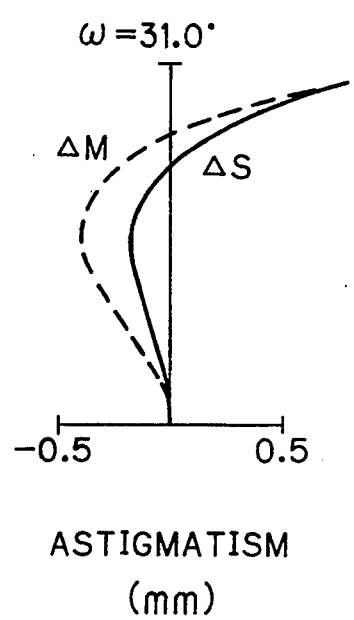
ASTIGMATISM
(mm)
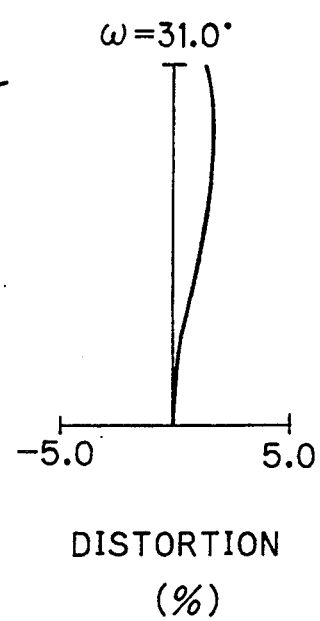
DISTORTION
(%)

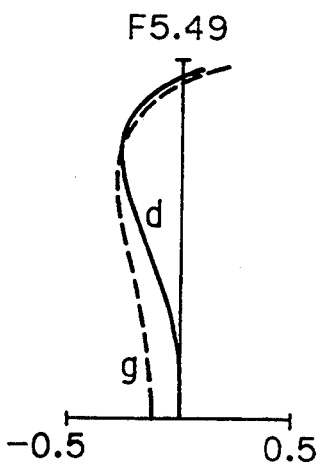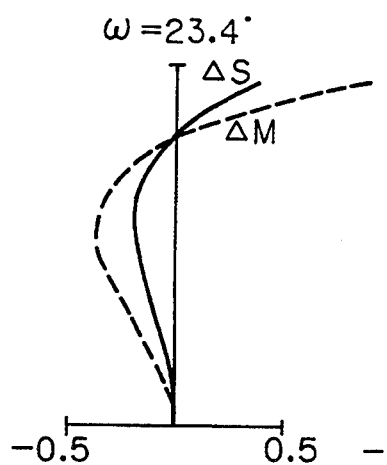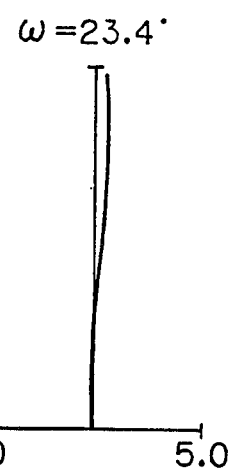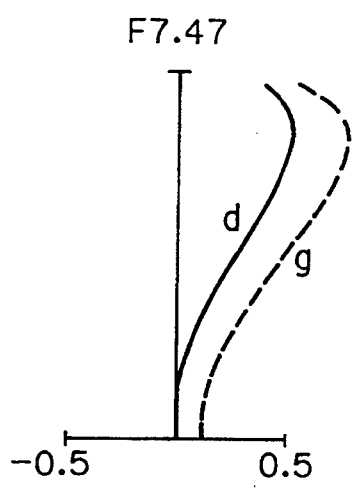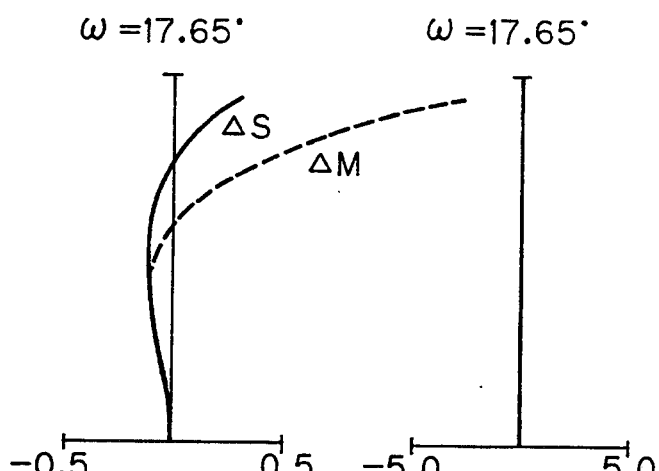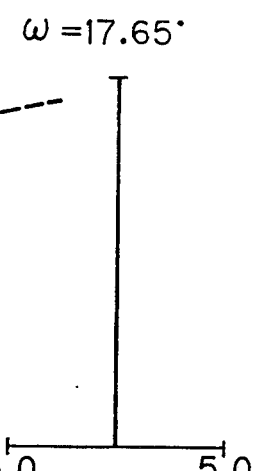

FIG. 23A    FIG. 23B    FIG. 23C
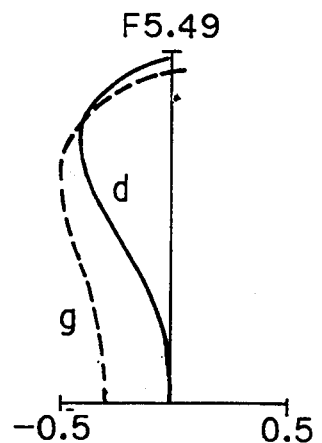
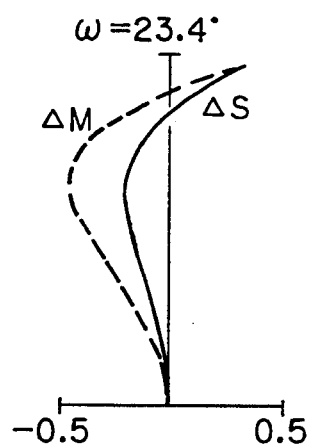
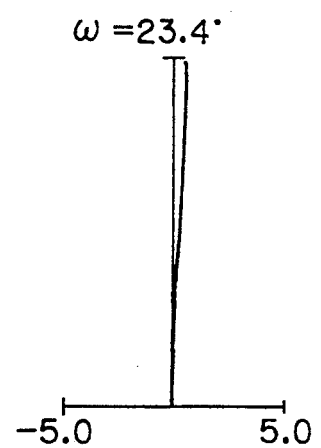
SPHERICAL
ABERRATION
(mm)
ASTIGMATISM
(mm)
DISTORTION
(%)
FIG. 24A    FIG. 24B    FIG. 24C
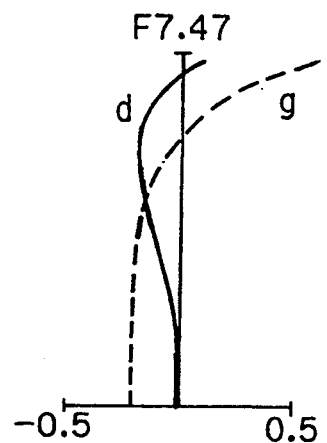
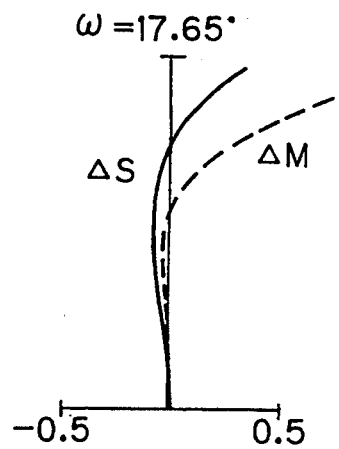
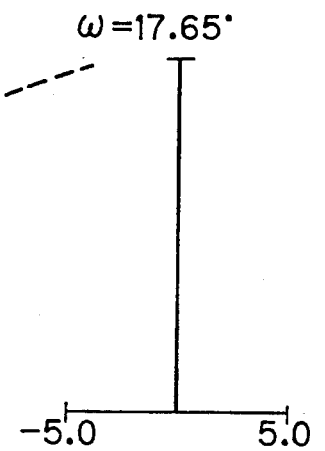
SPHERICAL
ABERRATION
(mm)
ASTIGMATISM
(mm)
DISTORTION
(%)

FIG. 29
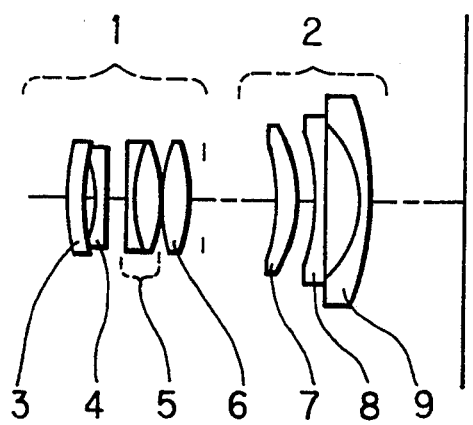
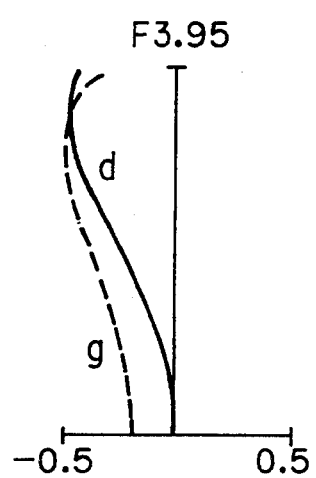
FIG. 30A
SPHERICAL ABERRATION (mm)
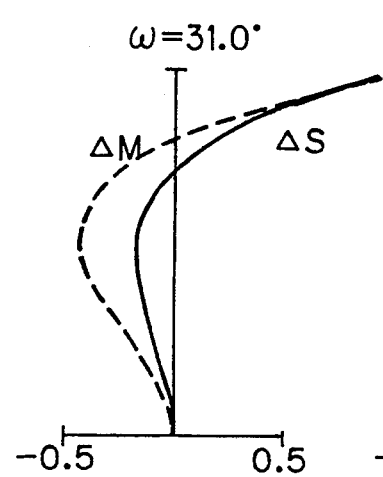
FIG. 30B
ASTIGMATISM (mm)
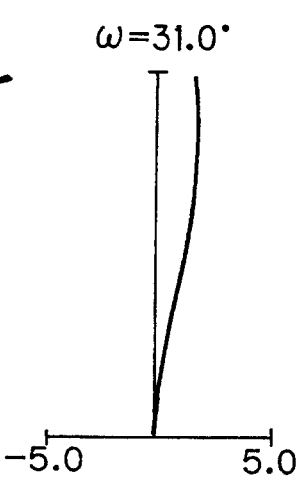
FIG. 30C
DISTORTION (%)

SPHERICAL
ABERRATION
(mm)

ASTIGMATISM
(mm)

DISTORTION
(%)

SPHERICAL
ABERRATION
(mm)

ASTIGMATISM
(mm)

DISTORTION
(%)

SPHERICAL
ABERRATION
(mm)

ASTIGMATISM
(mm)

DISTORTION
(%)

SPHERICAL ABERRATION (mm)   ASTIGMATISM (mm)   DISTORTION (%)

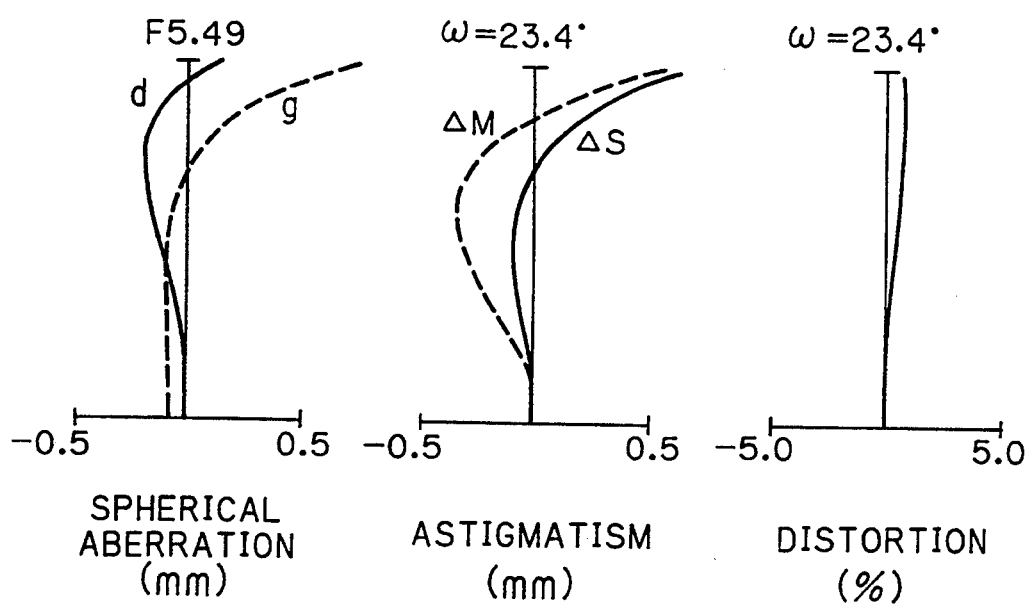
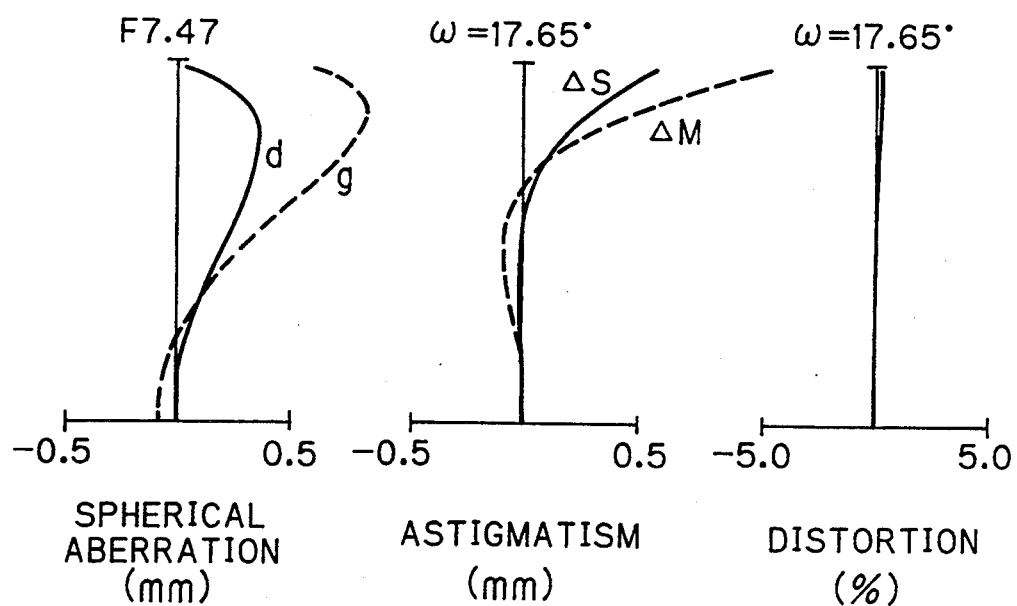

FIG. 41
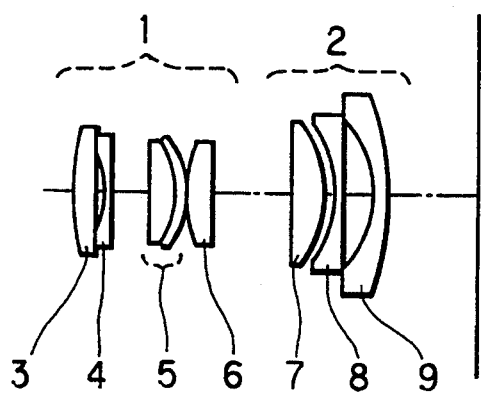
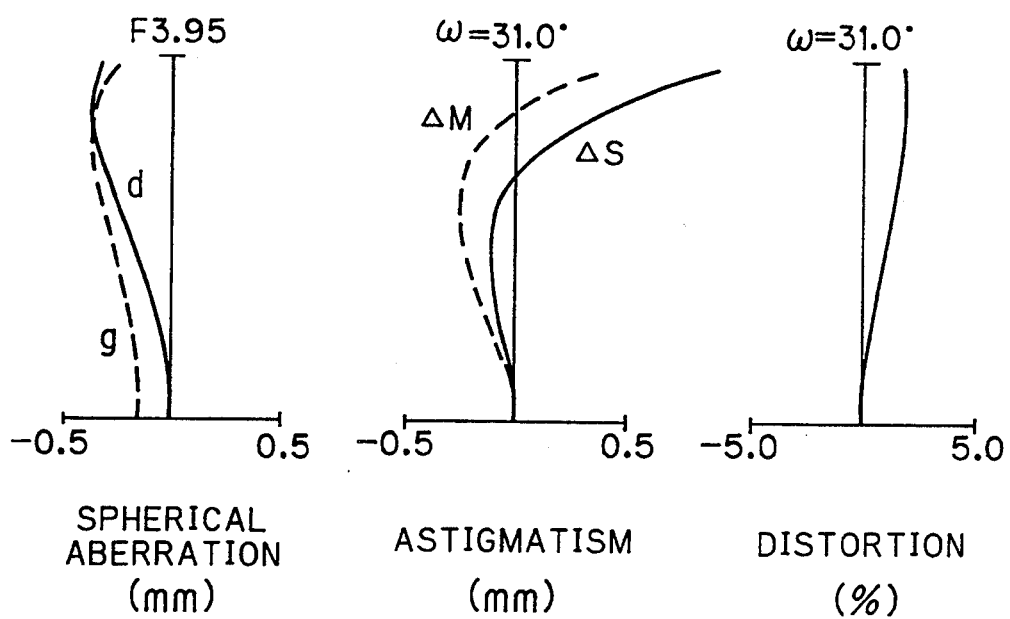
FIG. 42A   FIG. 42B   FIG. 42C
SPHERICAL ABERRATION (mm)   ASTIGMATISM (mm)   DISTORTION (%)

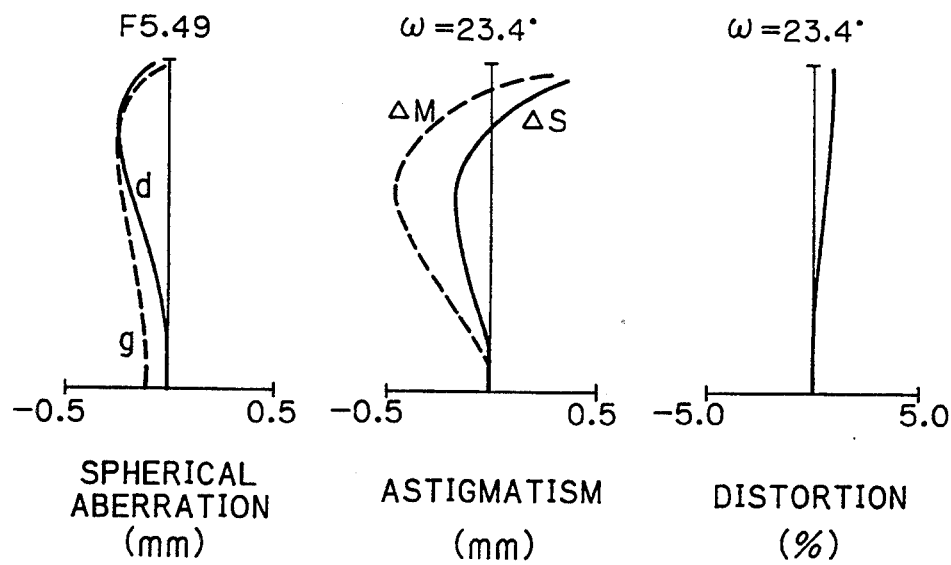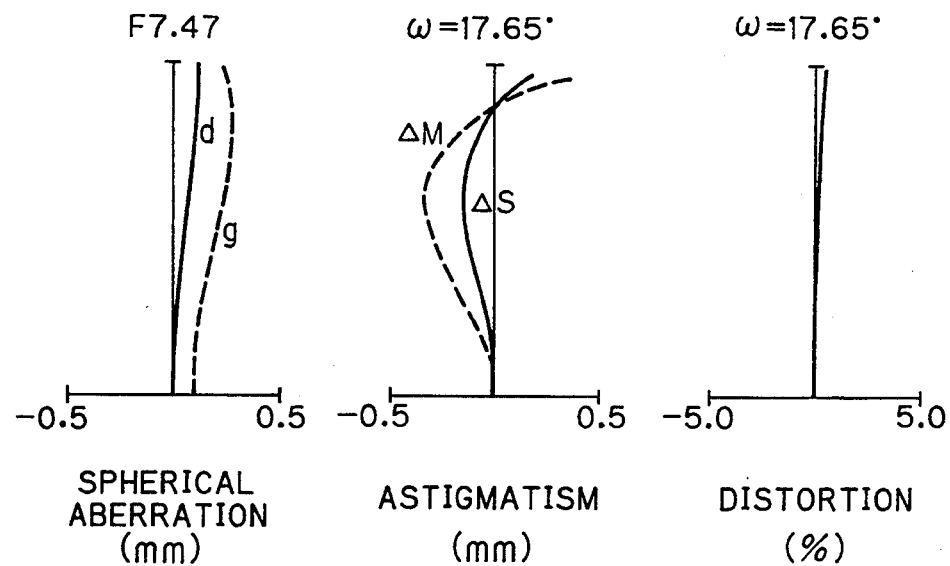

FIG. 49
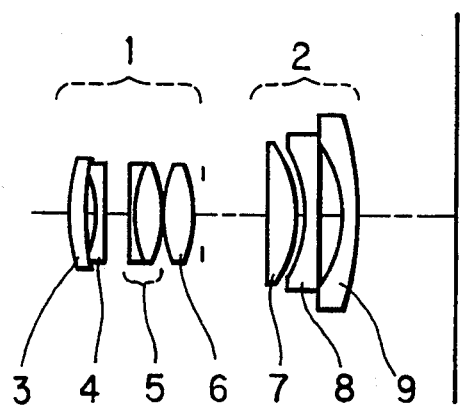
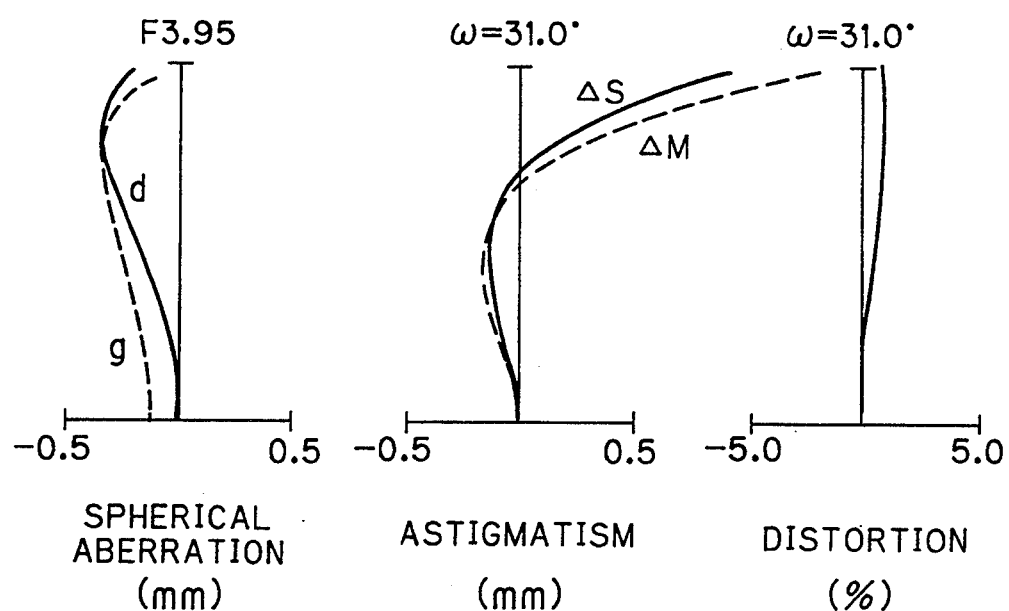
FIG. 50A  FIG. 50B  FIG. 50C
SPHERICAL ABERRATION (mm)  ASTIGMATISM (mm)  DISTORTION (%)

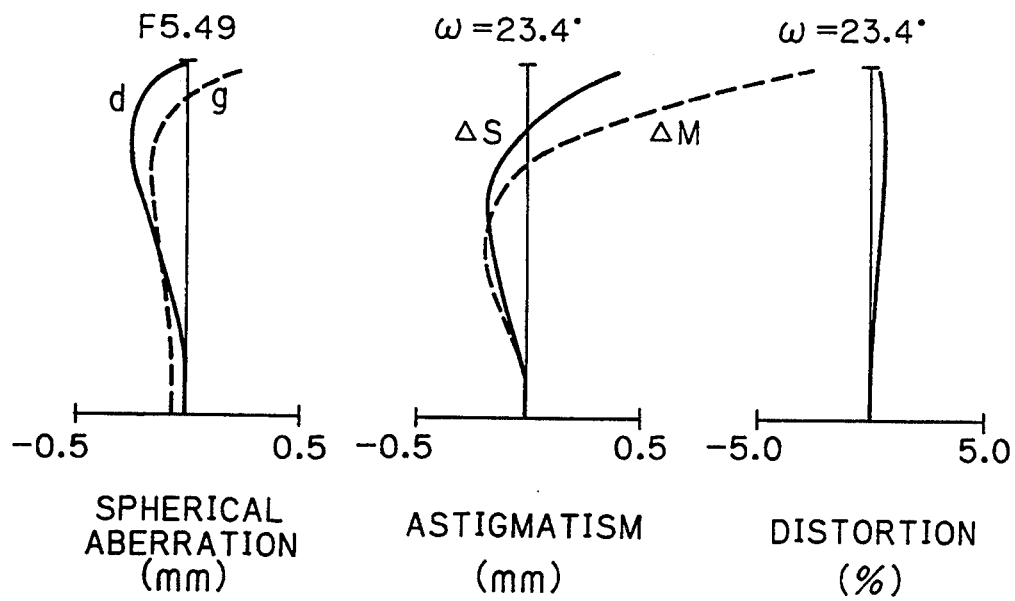
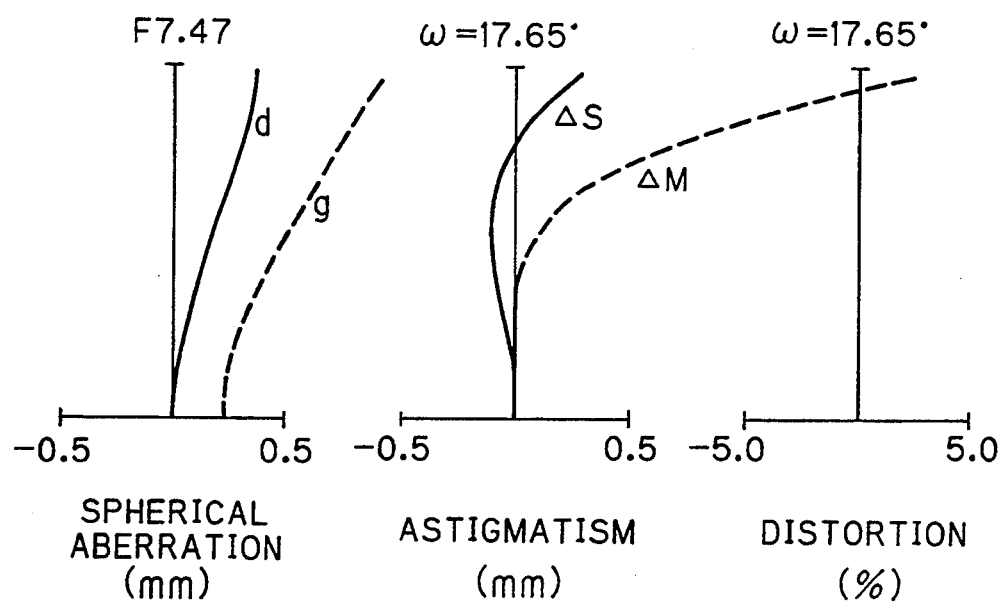

SPHERICAL ABERRATION (mm)

ASTIGMATISM (mm)

DISTORTION (%)

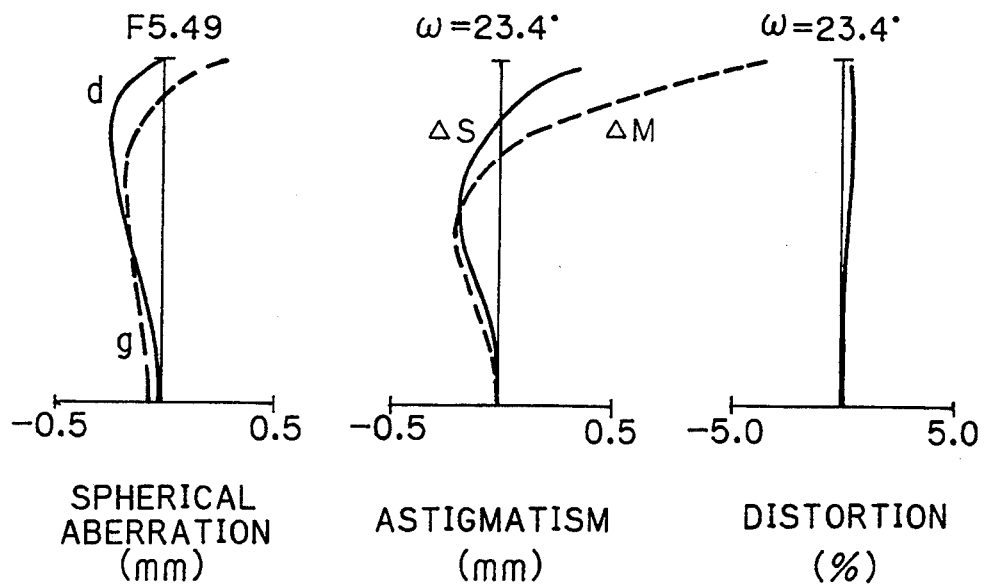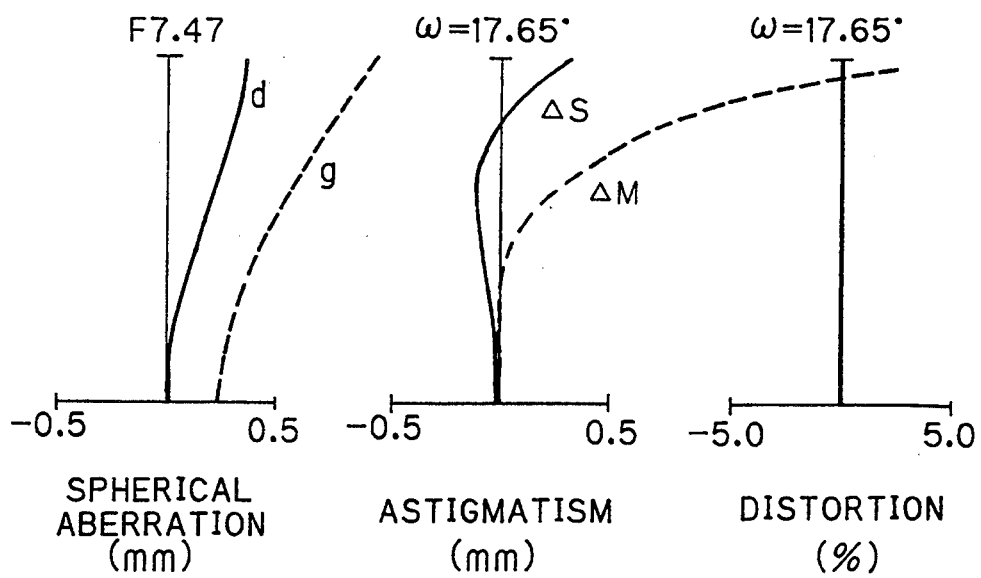

COMPACT ZOOM LENS SYSTEM

BACKGROUND OF THE INVENTION

1. Field of the Invention

The present invention relates to a compact zone lens system suitable for use in lens-shutter cameras and video cameras. More particularly, the present invention relates to a compact zoom lens system which provides good correction of various aberrations and minimizes the length and the diameter of the lens barrel thereof in a rest position wherein the lens barrel is retracted to the maximum into the camera body.

2. Related Art

Recently, as lens-shutter cameras, video cameras and the like tend to be designed as compact as possible, it has been sought to provide the camera with a compact zoom lens system. Especially in lens-shutter cameras, it has been sought to make zoom cameras as small as conventional fixed-focus cameras. For this purpose, it is desirable to shorten the length of the lens barrel of the zoom lens system in the rest position and to minimize the diameter of the lens barrel.

It is necessary, for minimizing the diameter of the lens barrel, to construct the zoom lens system in such a manner as to simplify the construction of the lens barrel, not to mention the reduction of the diameter of the lenses. To achieve a simple construction of the lens barrel, various types of such zoom lens systems are known, for example, from Japanese Laid-Open Patent Appln. 56-128911, that consist of a forward lens group of a positive power and a rearward lens group of a negative power arranged in this order from the object side.

However, because the telephoto ratio in the telephoto mode is above 1 in these prior art systems, they are unsuitable for shortening the length of the lens barrel in the rest position. It is to be noted herein that the telephoto ratio means the value of the overall length of the lens system including the back focal distance thereof divided by the focal length.

In a zoom lens system composed of a forward lens group of a positive power and a rearward lens group of a negative power, the entire length of the system including the back focal distance can be shorter the greater is the refracting power of the forward lens group. However, if the refracting power of the forward lens group is simply increased, there would result an extremely short back focal distance in the wide-angle mode, or an unnecessarily strong refracting power of the rearward lens group. In that case, curvature of the field worsens, and the fluctuation of various aberrations upon zooming becomes greater.

Japanese Laid-Open Patent Appln. 63-161422 and 2-284109 also disclose a compact zoom lens system composed of a forward lens group of a positive power and a rearward lens group of a negative power. However, because the latter lens group has a large diameter, the zoom lens systems of these prior devices are unsuitable for minimizing the diameter of the lens barrel. Moreover, the former zoom lens not only has a small zoom ratio, less than a factor of 2, but also has a high telephoto ratio in the telephoto mode. The latter zoom lens system has a telephoto ratio in the telephoto mode that is even greater than that of the former zoom lens, because the latter zoom lens system is a wide-angle zoom lens.

It is also widely known to use aspherical lenses for shortening the overall length of the lens system. However, if the aspherical lens is mode of a plastic resin, it is impossible to completely eliminate the shift of focus due to variations of temperature and humidity. On the other hand, an aspherical lens made of glass is expensive.

OBJECTS OF THE INVENTION

An object of the present invention is to provide a zoom lens system, of which the lens barrel has a shortened length in the rest position and a small diameter as well.

Another object of the present invention is to minimize both the telephoto ratio of the zoom lens system in the telephoto mode and the effective aperture of the last lens surface without the need for an aspherical lens.

DETAILED DESCRIPTION OF THE INVENTION

According to the present invention, a zoom lens system is composed of a forward lens group of a positive power and a rearward lens group of a negative power arranged in this order from the object side, and the magnification of the zoom lens system is changed by changing the spacing between the forward lens group and the rearward lens group. The forward lens group is composed of first lens means of a positive power with a highly convex surface directed to the object, second lens means of a negative power, third lens means including at least a negative lens and having a positive power as the whole, and fourth lens means of positive power, which are arranged in this order from the object side. Thereby, the refracting power of the forward lens group is concentrated toward the image side, and the back principal point of the forward lens group is nearer to the image side, so that a sufficient back focal distance in the wide-angle mode is obtained, while the refracting power of the rearward lens is limited.

According to the present invention, the rearward lens group is composed of fifth lens means of a positive power with a highly convex surface directed to the image surface side, sixth lens means of a negative power, and seventh lens means of a negative power with a highly concave surface directed to the object, which are arranged in this order from the object side. Thereby, the fluctuation of various aberrations, such as spherical aberration, with the change of the magnification is limited.

The overall length including the back focal distance of the zoom lens system having the above-described construction can be shortened by providing the zoom lens system to satisfy the following condition:

$$1.40 < f_w/f_F < 2.0 \qquad (1)$$

wherein
$f_F$ is the focal length of the forward lens group;
$f_w$ is the focal length of the lens system in the wide-angle mode.

If the value $f_w/f_F$ is not less than 2.0, it would be easier to shorten the overall length, but the refracting power of the rearward lens group would become too great to limit the fluctuation of various aberrations upon zooming or magnification change no matter how the lenses of the rearward lens group are designed. Furthermore, since it then becomes hard to maintain a desirable Petzval sum, curvature of the field and astigmatism would be worsened.

It is possible to prevent the Petzval sum from being too small by composing the zoom lens system to satisfy the following condition:

$$Np < Nn \quad (2)$$

wherein

Np is the index of refraction of a convex lens of the third lens means;

Nn is the index of refraction of a concave lens of the third lens means.

Thereby, curvature of the field and astigmatism are desirably limited.

In order to minimize the diameter of the last lens, it is necessary to set the negative refracting power of the rearward lens group as near to the image surface as possible, while ensuring a certain back focal distance. To achieve this requirement, the following condition is to be respected:

$$-0.45 < f_{67}/f_w < -0.1 \quad (3)$$

wherein $f_{67}$ is the resultant focal length of the sixth and seventh lens means.

Below the lower limit of the condition (3), it would be impossible to reduce the diameter of the last lens while maintaining various aberrations desirably small. Above the upper limit of the condition (3), the negative power of the rearward lens group becomes so strong that the fluctuation of aberrations upon zooming, especially the fluctuation of spherical aberration, would become too great.

It is preferable to configure the zoom lens system of the present invention to satisfy also the following condition:

$$0.5 < f_6/f_7 < 0.8 \quad (4)$$

wherein $f_6$ is the focal length of the sixth lens means; and $f_7$ is the focal length of the seventh lens means.

Thereby, it becomes easier to reduce the size of the last lens. If the value $f_6/f_7$ is less than 0.5, it would be necessary, for minimizing the diameter of the last lens to increase the negative power of the rearward lens group. This results in an increase of the fluctuation of aberration upon zooming, especially of spherical aberration. If the value $f_6/f_7$ is greater than 0.8, the refracting power of the seventh lens means would become too great, although it is preferable for minimizing the diameter of the last lens to set the value $f_6/f_7$ to be large. Since the thickness of axial bundle of rays changes upon zooming largely in the seventh lens means, the fluctuation of various aberrations upon zooming would become too great above the upper limit of condition (4). Especially, spherical aberration in the telephoto mode would be over-corrected.

It is more preferable to configure the zoom lens system of the present invention to satisfy the following condition:

$$-3 < (f_{12} \times f_{34})/f^{F2} < -0.5 \quad (5)$$

wherein $f_{12}$ is the resultant focal length of the first and second lens means; and $f_{34}$ is the resultant focal length of the third and fourth lens means.

Thereby it is possible to set the back principal point of the forward lens group in a proper position, so that the overall length can be shortened without worsening the balance of various aberrations. Below the lower limit of this condition (5), the refracting power of the respective lenses of the forward lens group would be extremely great, so that spherical aberration of a high degree, negative distortion and astigmatism would be increased. Moreover, since the aperture should be large in that case, the diameter of the lens barrel cannot be sufficiently minimized. Above the upper limit of condition (5), the principal point of the forward lens group would be set too close to the object side, resulting in too great a refracting power of the rearward lens group. Therefore, the fluctuation of various aberrations upon zooming would become great, and it would be difficult to maintain the proper back focal distance.

It is still more preferable to configure the convex lens and the concave lens of the third lens means to satisfy the following condition:

$$\nu p > \nu n \quad (6)$$

wherein $\nu p$ and $\nu n$ are the Abbe numbers of the convex and concave lenses of the third lens means respectively.

Condition (6) contributes to decreasing transverse chromatic aberration especially in the wide-angle mode.

BRIEF DESCRIPTION OF THE DRAWINGS

The present invention will now be described in detail with respect to preferred embodiments with reference to the accompanying drawings, wherein like reference numerals designate like or corresponding parts throughout the several views, and wherein:

FIGS. 3A, 3B and 3C are diagrams showing various aberrations of Example 1 in a middle focal length position;

FIGS. 4A, 4B and 4C are diagrams showing various aberrations of Example 1 in the telephoto mode;

FIG. 5 is a schematic diagram showing a lens system according to Example 2 of the present invention;

FIGS. 6A, 6B and 6C are diagrams showing various aberrations of the lens system of Example 2 in the wide-angle mode;

FIGS. 7A, 7B and 7C are diagrams showing various aberrations of Example 2 in a middle focal length position;

FIGS. 8A, 8B and 8C are diagrams showing various aberrations of Example 2 in the telephoto mode;

FIG. 9 is a schematic diagram showing a lens system according to Example 3 of the present invention;

FIGS. 10A, 10B and 10C are diagrams showing various aberrations of the lens system of Example 3 in the wide-angle mode;

FIGS. 11A, 11B and 11C are diagrams showing various aberrations of Example 3 in a middle focal length position;

FIGS. 12A, 12B and 12C are diagrams showing various aberrations of Example 3 in the telephoto mode;

FIG. 13 is a schematic diagram showing a lens system according to Example 4 of the present invention;

FIGS. 14A, 14B and 14C are diagrams showing various aberrations of the lens system of Example 4 in the wide-angle mode;

FIGS. 15A, 15B and 15C are diagrams showing various aberrations of Example 4 in a middle focal length position;

FIGS. 16A, 16B and 16C are diagrams showing various aberrations of Example 4 in the telephoto mode;

FIG. 17 is a schematic diagram showing a lens system according to Example 5 of the present invention;

FIGS. 18A, 18B and 18C are diagrams showing various aberrations of the lens system of Example 5 in the wide-angle mode;

FIGS. 19A, 19B and 19C are diagrams showing various aberrations of Example 5 in a middle focal length position;

FIGS. 20A, 20B and 20C are diagrams showing various aberrations of Example 5 in the telephoto mode;

FIGS. 23A, 23B and 23C are diagrams showing various aberrations of Example 6 in a middle focal length position;

FIGS. 24A, 24B and 24C are diagrams showing various aberrations of Example 6 in the telephoto mode;

FIG. 29 is a schematic diagram showing a lens system according to Example 8 of the present invention;

FIGS. 30A, 30B and 30C are diagrams showing various aberrations of the lens system of Example 8 in the wide-angle mode;

FIGS. 39A, 39B and 39C are diagrams showing various aberrations of Example 10 in a middle focal length position;

FIGS. 40A, 40B and 40C are diagrams showing various aberrations of Example 10 in the telephoto mode;

FIG. 41 is a schematic diagram showing a lens system according to Example 11 of the present invention;

FIGS. 42A, 42B and 42C are diagrams showing various aberrations of the lens system of Example 11 in the wide-angle mode;

FIGS. 47A, 47B and 47C are diagrams showing various aberrations of Example 12 in a middle focal length position;

FIGS. 48A, 48B and 48C are diagrams showing various aberrations of Example 12 in the telephoto mode;

FIG. 49 is a schematic diagram showing a lens system according to Example 13 of the present invention;

FIGS. 50A, 50B and 50C are diagrams showing various aberrations of the lens system of Example 13 in the wide-angle mode;

FIGS. 51A, 51B and 51C are diagrams showing various aberrations of Example 13 in a middle focal length position;

FIGS. 52A, 52B and 52C are diagrams showing various aberrations of Example 13 in the telephoto mode;

FIGS. 55A, 55B and 55C are diagrams showing various aberrations of Example 14 in a middle focal length position; and FIGS. 56A, 56B and 56C are diagrams showing various aberrations of Example 14 in the telephoto mode.

DETAILED DESCRIPTION OF THE PREFERRED EMBODIMENT

Figure 1A:
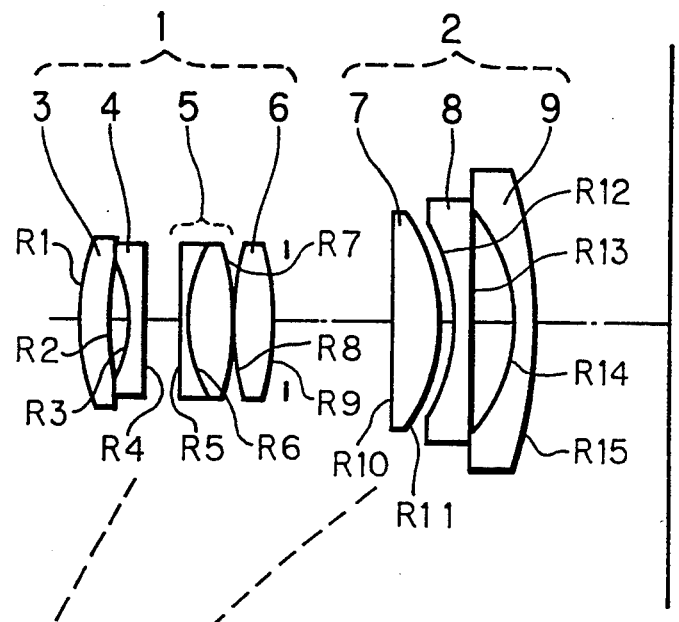
FIGS. 1A and 1B are schematic diagrams showing a lens system according to Example 1 of the present invention, in the wide-angle mode and in the telephoto mode respectively.

The zoom lens systems of the first to fourteenth Examples of the present invention, as shown respectively in FIGS. 1A, 1B, 5, 9, 13, 17, 21, 25, 29, 33, 37, 41, 45, 49 and 53, are each composed of a forward lens group 1 and a rearward lens group 2 wherein the forward lens group 1 and the rearward lens group 2 are moved to the object side while the spacing between these groups is changed when the magnification is changed from the short focal length side to the long focal length side.

The forward lens group 1 is composed of first lens means 3 of a positive power with a highly convex surface directed to the object, second lens means 4 of a negative power, third lens means 5 including a meniscus lens of a negative power and a convex lens and having a positive power as a whole, and fourth lens means 6 of positive power, which are arranged in this order from the object side. The rearward lens group 2 is composed of fifth lens means 7 of a positive power with a highly convex surface directed to the image surface side, sixth lens means 8 of a negative power, and seventh lens means 9 of a negative power with a highly concave surface directed to the object, which are arranged in this order from the object side.

Figure 1B:
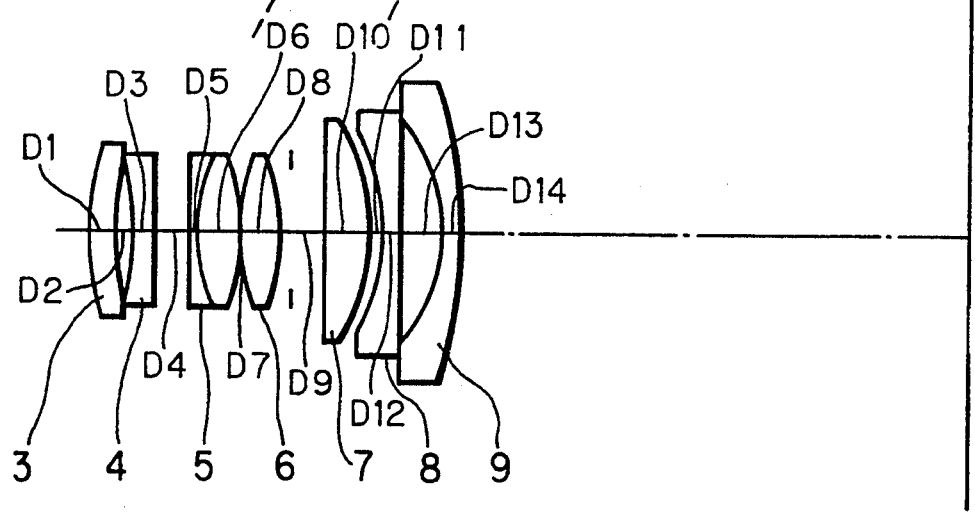

Numerical values for the respective examples will be described below. In FIGS. 1A and 1B, R1 to R15 designate the surfaces of the lens elements of the lens system, and D1 to D14 designate the spacings between these surfaces. Because the other examples have equivalent constructions, these designations are omitted from the subsequent figures of the drawings for clarity. However, according to the twelfth and thirteenth Examples shown in FIGS. 45 and 49, the third lens means 5 is not a doublet but has an air space between the two lens elements of the third lens means. Therefore, in the twelfth and thirteenth Examples, R5 to R8 designate the respective surfaces of the third lens means, R16 designates the last surface, and D10 designates the spacing between the forward lens group and the rearward lens group.

In the numerical values that follow, R is the radius of curvature of the respective surfaces of the lens elements, D the spacing between two adjacent surfaces of the lens elements, Nd the refractive index with respect to d-line, $\nu d$ the Abbe number, f the total focal length of the lens system, F the f-number, and $\omega$ the half angle of view. In all the examples, the aperture is disposed 1.0 mm behind the forward lens group 1.

EXAMPLE 1

| | f = 36.00 to 68.00 | | | |
| | F = 3.95 to 7.47 | | | |
| | $\omega$ = 31.00 to 17.65 | | | |
| Surface No. | R | D | Nd | $\nu d$ |
| --- | --- | --- | --- | --- |
| 1 | 15.733 | 2.06 | 1.67003 | 47.20 |
| 2 | 29.018 | 1.27 | | |
| 3 | −16.944 | 1.36 | 1.77250 | 49.62 |
| 4 | −437.490 | 2.49 | | |
| 5 | 132.626 | 0.80 | 1.83400 | 37.34 |
| 6 | 11.215 | 3.10 | 1.56883 | 56.04 |
| 7 | −22.798 | 0.20 | | |
| 8 | 20.731 | 2.76 | 1.51680 | 64.20 |
| 9 | −18.712 | variable | | |
| 10 | −119.824 | 3.35 | 1.59270 | 35.45 |
| 11 | −13.789 | 1.07 | | |
| 12 | −14.292 | 1.20 | 1.77250 | 49.62 |
| 13 | −126.414 | 3.23 | | |
| 14 | −11.573 | 1.30 | 1.77250 | 49.62 |
| 15 | −37.963 | | | |

The spacing D9 (mm) between the forward lens group and the rearward lens group varies with the change of the focal length f (mm), and the respective values of D9 in the wide-angle mode (f=36.00), a middle focal length position (f=50.00) and the telephoto mode (f=68.00) are as follows:

| f | D9 |
| --- | --- |
| 36.00 | 9.10 |
| 50.00 | 5.86 |
| 68.00 | 3.66 |

Characteristic values of the zoom lens system of Example 1 are as follows:

| | |
| --- | --- |
| $f_W/f_F =$ | 1.62 |
| $f_{67}/f_W =$ | −0.27 |
| $f_6/f_7 =$ | 0.95 |
| $(f_{12} \times f_{34})/f_F^2 =$ | −1.69 | wherein $f_w$ is the focal length of the lens system in the wide-angle mode; $f_F$ is the focal length of the forward lens group 1; $f_{67}$ is the resultant focal length of the sixth and seventh lens means 8 and 9; $f_6$ is the focal length of the sixth lens means 8; $f_7$ is the focal length of the seventh lens means 9; $f_{12}$ is the resultant focal length of the first and second lens means 3 and 4; and $f_{34}$ is the resultant focal length of the third and fourth lens means 5 and 6.

The telephoto ratio, which is defined as the value of the overall length including the back focal distance of the lens system in the telephoto mode divided by the focal length f thereof, and the width of the outermost principal ray passing through the seventh lens means 9, that is, the last lens, in the wide-angle mode are as follows:

telephoto ratio=0.96
width of principal ray on the last surface=8.28

The width of the principal ray on the last surface is a determining factor for the effective aperture of the last lens. Because the effective aperture of the last lens itself varies depending on the magnitude of eclipse due to the rearward lens group or for other reasons, a simple comparison is difficult. Therefore, the width of the principal ray on the last surface, means herein the width of the outermost principal ray passing through the last lens in the wide-angle mode.

Figure 2A:
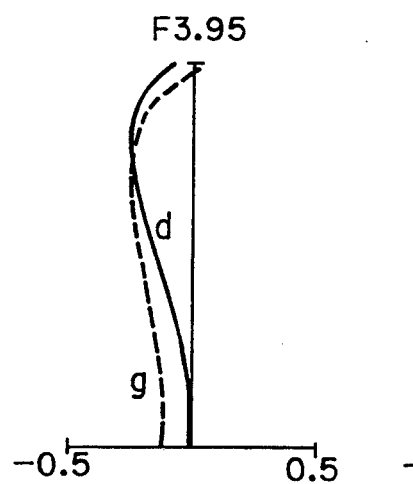
FIGS. 2A, 2B and 2C are diagrams showing various aberrations of the lens system of Example 1 in the wide-angle mode.
Figure 2B:
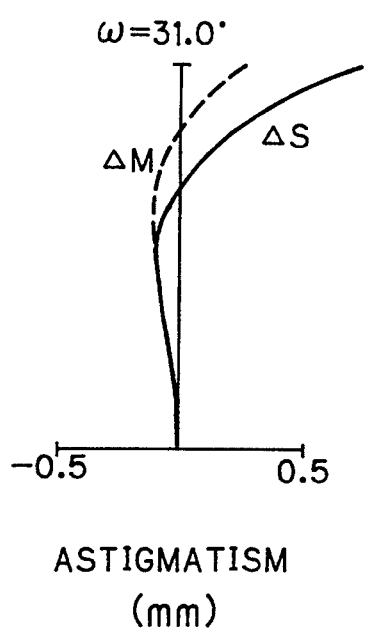
Figure 2C:
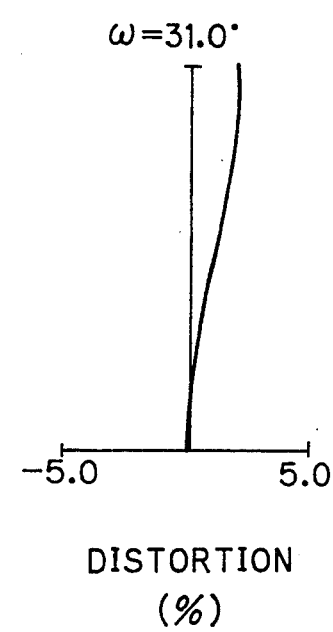

Spherical aberration, astigmatism and distortion of Example 1 in the wide-angle mode (f=36.00) are illustrated in FIGS. 2A, 2B and 2C, those in the middle focal length position (f=50.00) are illustrated in FIGS. 3A, 3B and 3C, and those in the telephoto mode (f=68.00) are illustrated in FIGS. 4A, 4B and 4C, respectively.

EXAMPLE 2

| | f = 36.00 to 68.00 | | | |
| | F = 3.95 to 7.47 | | | |
| | $\omega$ = 31.00 to 17.65 | | | |
| Surface No. | R | D | Nd | $\nu d$ |
| --- | --- | --- | --- | --- |
| 1 | 17.201 | 2.03 | 1.67003 | 47.20 |
| 2 | 37.105 | 1.23 | | |
| 3 | −15.691 | 0.80 | 1.77250 | 49.62 |
| 4 | −125.886 | 2.53 | | |
| 5 | −696.293 | 0.80 | 1.83400 | 37.34 |
| 6 | 12.401 | 3.10 | 1.56883 | 56.04 |
| 7 | −19.478 | 0.20 | | |
| 8 | 23.322 | 2.73 | 1.51680 | 64.20 |
| 9 | −18.118 | variable | | |
| 10 | −316.241 | 3.35 | 1.59270 | 35.45 |
| 11 | −14.946 | 1.03 | | |
| 12 | −15.737 | 1.20 | 1.77250 | 49.62 |
| 13 | −285.375 | 3.14 | | |
| 14 | −12.430 | 1.30 | 1.77250 | 49.62 |
| 15 | −47.860 | | | |

| f | D9 |
| --- | --- |
| 36.00 | 9.23 |
| 50.00 | 5.84 |
| 68.00 | 3.53 |
| $f_W/f_F =$ | 1.60 |
| $f_{67}/f_W =$ | −0.28 |
| $f_6/f_7 =$ | 0.98 |
| $(f_{12} \times f_{34})/f_F^2 =$ | −1.84 |
| telephoto ratio = | 0.96 |
| width of principal ray on the last surface = | 8.17. |

Example 2 is shown in FIG. 5, and the spherical aberration, astigmatism and distortion of Example 2 are illustrated in FIGS. 6A, 6B and 6C with respect to the wide-angle mode (f=36.00), in FIGS. 7A, 7B and 7C with respect to the middle focal length position (f=50.00), and in FIGS. 8A, 8B and 8C with respect to the telephoto mode (f=68.00), respectively.

EXAMPLE 3

| |
| --- |
| f = 36.00 to 67.96 |

-continued

| | F = 3.95 to 7.47 | | | |
|---|---|---|---|---|
| | ω = 31.00 to 17.65 | | | |
| Surface No. | R | D | Nd | νd |
| 1 | 18.715 | 1.95 | 1.72000 | 50.34 |
| 2 | 37.143 | 1.24 | | |
| 3 | −15.874 | 0.80 | 1.77250 | 49.62 |
| 4 | −139.040 | 3.53 | | |
| 5 | 108.232 | 0.80 | 1.83400 | 37.34 |
| 6 | 12.988 | 3.01 | 1.56883 | 56.04 |
| 7 | −22.963 | 0.20 | | |
| 8 | 25.146 | 1.56 | 1.48749 | 70.44 |
| 9 | −19.326 | variable | | |
| 10 | 71.104 | 3.77 | 1.59270 | 35.45 |
| 11 | −16.474 | 0.35 | | |
| 12 | −22.585 | 1.20 | 1.77250 | 49.62 |
| 13 | 138.109 | 3.61 | | |
| 14 | −11.795 | 1.30 | 1.80420 | 49.50 |
| 15 | −73.496 | | | |

| f | D9 |
|---|---|
| 36.00 | 10.0 |
| 49.98 | 6.14 |
| 67.96 | 3.5 |

| | |
|---|---|
| $f_W/f_F =$ | 1.50 |
| $f_{67}/f_W =$ | −0.26 |
| $f_6/f_7 =$ | 1.42 |
| $(f_{12} \times f_{34})/f_F^2 =$ | −1.50 |
| telephoto ratio = | 0.96 |
| width of principal ray on the last surface = | 8.16 |

Example 3 is shown in FIG. 9, and the spherical aberration, astigmatism and distortion of Example 3 are illustrated in FIGS. 10A, 10B and 10C with respect to the wide-angle mode (f=36.00), in FIGS. 11A, 11B and 11C with respect to the middle focal length position (f=49.98), and in FIGS. 12A, 12B and 12C with respect to the telephoto mode (f=67.96), respectively.

EXAMPLE 4

| | f = 36.00 to 68.00 | | | |
|---|---|---|---|---|
| | F = 3.95 to 7.47 | | | |
| | ω = 31.00 to 17.65 | | | |
| Surface No. | R | D | Nd | νd |
| 1 | 16.304 | 2.05 | 1.56732 | 42.84 |
| 2 | 29.817 | 1.42 | | |
| 3 | −14.649 | 0.80 | 1.77250 | 49.62 |
| 4 | −43.118 | 3.04 | | |
| 5 | −199.446 | 0.80 | 1.88300 | 40.80 |
| 6 | 13.679 | 3.07 | 1.51680 | 64.20 |
| 7 | −18.210 | 0.20 | | |
| 8 | 21.743 | 2.84 | 1.48749 | 70.44 |
| 9 | −19.871 | variable | | |
| 10 | 35.440 | 3.87 | 1.67270 | 32.17 |
| 11 | −21.076 | 0.46 | | |
| 12 | −27.766 | 1.20 | 1.88300 | 40.80 |
| 13 | 45.236 | 3.98 | | |
| 14 | −12.175 | 1.30 | 1.80420 | 46.50 |
| 15 | −75.313 | | | |

| f | D9 |
|---|---|
| 36.00 | 10.22 |
| 50.00 | 6.22 |
| 68.00 | 3.5 |

| | |
|---|---|
| $f_W/f_F =$ | 1.45 |
| $f_{67}/f_W =$ | −0.23 |
| $f_6/f_7 =$ | 1.06 |
| $(f_{12} \times f_{34})/f_F^2 =$ | −2.00 |
| telephoto ratio = | 0.96 |
| width of principal ray on the last surface = | 8.16 |

Example 4 is shown in FIG. 13, and the spherical aberration, astigmatism and distortion of Example 4 are illustrated in FIGS. 14A, 14B and 14C with respect to the wide-angle mode (f=36.00), in FIGS. 15A, 15B and 15C with respect to the middle focal length position (f=50.00), and in FIGS. 16A, 16B and 16C with respect to the telephoto mode (f=68.00), respectively.

EXAMPLE 5

| | f = 36.00 to 68.00 | | | |
|---|---|---|---|---|
| | F = 3.95 to 7.47 | | | |
| | ω = 31.00 to 17.65 | | | |
| Surface No. | R | D | Nd | νd |
| 1 | 16.613 | 2.10 | 1.56732 | 42.84 |
| 2 | 37.982 | 1.29 | | |
| 3 | −15.327 | 0.80 | 1.77250 | 49.62 |
| 4 | −552.501 | 1.69 | | |
| 5 | 45.279 | 0.80 | 1.83400 | 37.34 |
| 6 | 9.626 | 5.00 | 1.56883 | 56.04 |
| 7 | −20.382 | 0.44 | | |
| 8 | 19.714 | 2.84 | 1.48749 | 70.44 |
| 9 | −17.370 | variable | | |
| 10 | −84.876 | 2.92 | 1.59270 | 35.45 |
| 11 | −12.624 | 0.79 | | |
| 12 | −13.590 | 1.20 | 1.77250 | 49.62 |
| 13 | 263.391 | 3.58 | | |
| 14 | −9.040 | 1.30 | 1.77250 | 49.62 |
| 15 | −21.237 | | | |

| f | D9 |
|---|---|
| 36.00 | 7.36 |
| 50.00 | 5.16 |
| 68.00 | 3.66 |

| | |
|---|---|
| $f_W/f_F =$ | 1.90 |
| $f_{67}/f_W =$ | −0.24 |
| $f_6/f_7 =$ | 0.78 |
| $(f_{12} \times f_{34})/f_F^2 =$ | −1.54 |
| telephoto ratio = | 0.96 |
| width of principal ray on the last surface = | 7.27 |

Example 5 is shown in FIG. 17, and the spherical aberration, astigmatism and distortion of Example 5 are illustrated in FIGS. 18A, 18B and 18C with respect to the wide-angle mode (f=36.00), in FIGS. 19A, 19B and 19C with respect to the middle focal length position (f=50.00), and in FIGS. 20A, 20B and 20C with respect to the telephoto mode (f=68.00), respectively.

EXAMPLE 6

| | f = 36.00 to 68.00 | | | |
|---|---|---|---|---|
| | F = 3.95 to 7.47 | | | |
| | ω = 31.00 to 17.65 | | | |
| Surface No. | R | D | Nd | νd |
| 1 | 14.293 | 2.48 | 1.59270 | 35.45 |
| 2 | 137.703 | 0.86 | | |
| 3 | −19.544 | 0.80 | 1.83400 | 37.34 |
| 4 | 20.777 | 2.74 | | |
| 5 | 21.356 | 0.80 | 1.83400 | 37.34 |
| 6 | 10.817 | 3.21 | 1.58913 | 61.25 |
| 7 | −21.346 | 0.20 | | |
| 8 | 186.896 | 2.84 | 1.67790 | 55.52 |
| 9 | −20.766 | variable | | |
| 10 | −69.286 | 3.19 | 1.59270 | 35.45 |
| 11 | −13.495 | 1.01 | | |
| 12 | −14.360 | 1.20 | 1.77250 | 49.62 |
| 13 | −147.074 | 3.32 | | |
| 14 | −11.539 | 1.30 | 1.77250 | 49.62 |
| 15 | −30.432 | | | |

| f | D9 |
|---|---|
| 36.00 | 9.25 |
| 50.00 | 6.00 |
| 68.00 | 3.79 |

| | |
|---|---|
| $f_W/f_F =$ | 1.63 |
| $f_{67}/f_W =$ | −0.29 |
| $f_6/f_7 =$ | 0.83 |
| $(f_{12} \times f_{34})/f_F^2 =$ | −0.74 |
| telephoto ratio = | 0.96 |

-continued

| | |
|---|---|
| width of principal ray on the last surface = | 8.48. |

Figure 21:
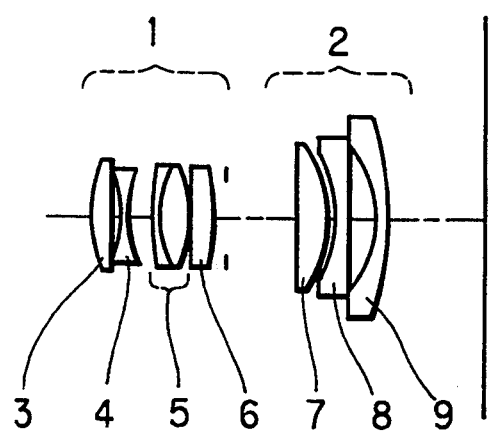
FIG. 21 is a schematic diagram showing a lens system according to Example 6 of the present invention.
Figures 22A, 22B, 22C:
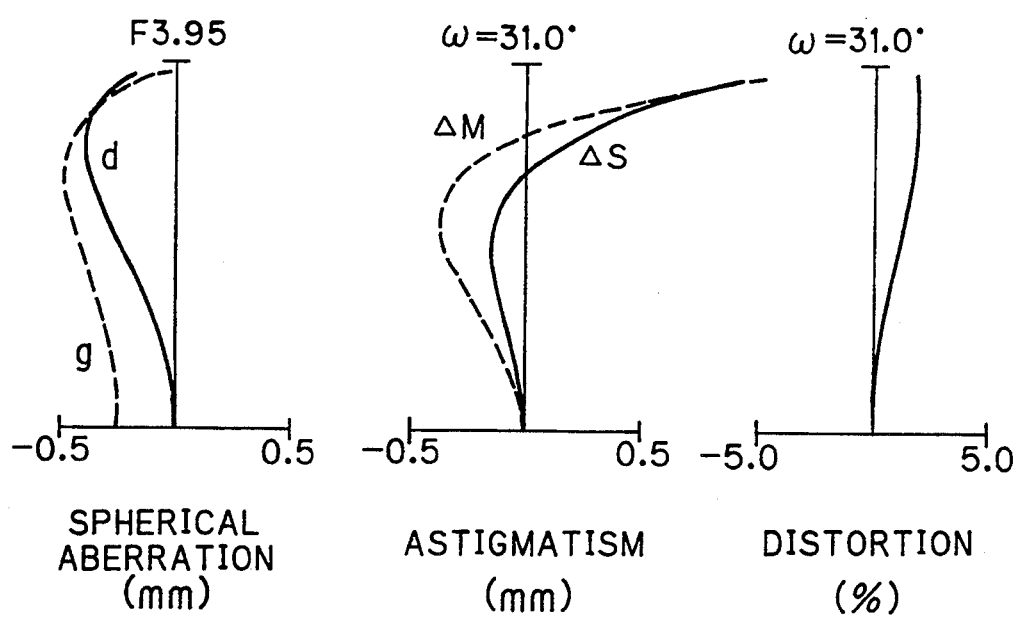
FIGS. 22A, 22B and 22C are diagrams showing various aberrations of the lens system of Example 6 in the wide-angle mode.

Example 6 is shown in FIG. 21, and the spherical aberration, astigmatism and distortion of Example 6 are illustrated in FIGS. 22A, 22B and 22C with respect to the wide-angle mode (f=36.00), in FIGS. 23A, 23B and 23C with respect to the middle focal length position (f=50.00), and in FIGS. 24A, 24B and 24C with respect to the telephoto mode (f=68.00), respectively.

EXAMPLE 7

| | f = 36.00 to 68.00 | | | |
|---|---|---|---|---|
| | F = 3.95 to 7.47 | | | |
| | ω = 31.00 to 17.65 | | | |
| Surface No. | R | D | Nd | νd |
| 1 | 16.602 | 2.18 | 1.54814 | 45.82 |
| 2 | 49.090 | 1.17 | | |
| 3 | −16.300 | 0.80 | 1.77250 | 49.62 |
| 4 | −108.171 | 2.50 | | |
| 5 | −60.107 | 1.33 | 1.83400 | 37.34 |
| 6 | 15.553 | 3.14 | 1.56883 | 56.04 |
| 7 | −14.462 | 0.20 | | |
| 8 | 18.165 | 2.84 | 1.48749 | 70.44 |
| 9 | −27.248 | variable | | |
| 10 | 51.931 | 2.74 | 1.68893 | 31.16 |
| 11 | −15.739 | 1.33 | | |
| 12 | −17.561 | 1.20 | 1.77250 | 49.62 |
| 13 | 188.918 | 3.52 | | |
| 14 | −10.894 | 1.30 | 1.77250 | 49.62 |
| 15 | −31.861 | | | |

| f | D9 |
|---|---|
| 36.00 | 9.33 |
| 50.00 | 6.10 |
| 68.00 | 3.90 |

| | |
|---|---|
| $f_W/f_F =$ | 1.62 |
| $f_{67}/f_W =$ | −0.30 |
| $f_6/f_7 =$ | 1.14 |
| $(f_{12} \times f_{34})/f_F^2 =$ | −2.36 |
| telephoto ratio = | 0.96 |
| width of principal ray on the last surface = | 8.43. |

Figure 25:
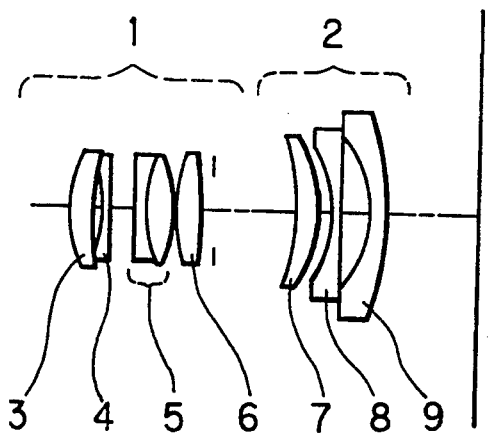
FIG. 25 is a schematic diagram showing a lens system according to Example 7 of the present invention.
Figures 26A, 26B, 26C:
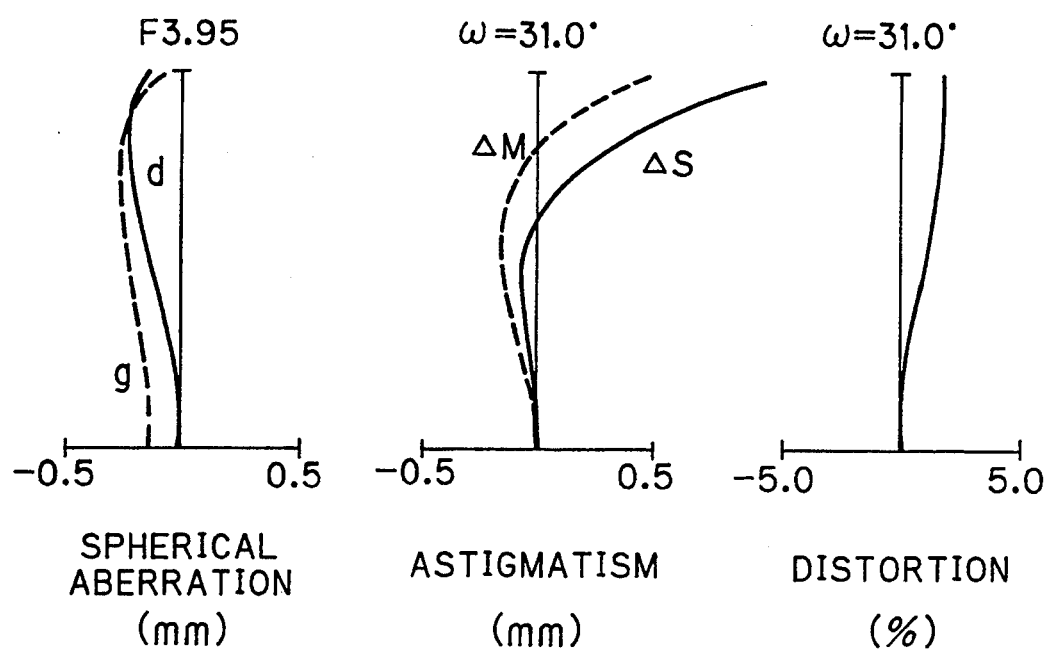
FIGS. 26A, 26B and 26C are diagrams showing various aberrations of the lens system of Example 7 in the wide-angle mode.
Figures 27A, 27B, 27C:
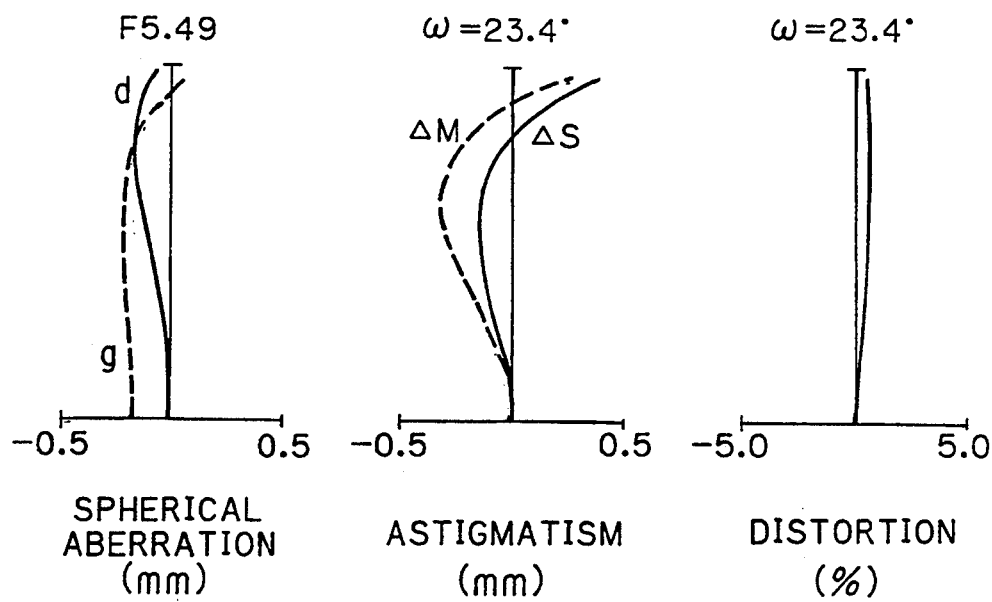
FIGS. 27A, 27B and 27C are diagrams showing various aberrations of Example 7 in a middle focal length position.
Figures 28A, 28B, 28C:
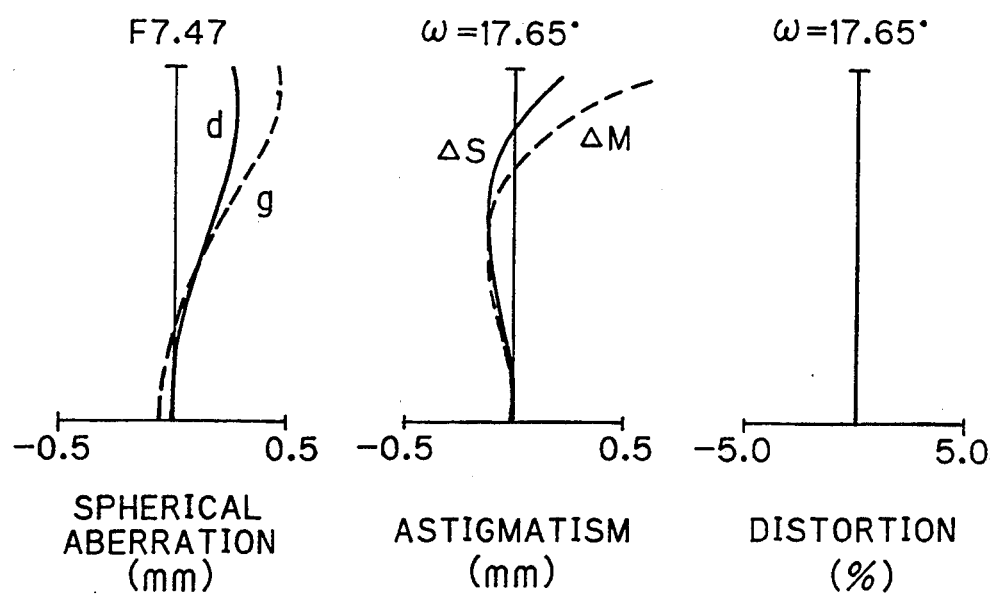
FIGS. 28A, 28B and 28C are diagrams showing various aberrations of Example 7 in the telephoto mode.

Example 7 is shown in FIG. 25, and the spherical aberration, astigmatism and distortion of Example 7 are illustrated in FIGS. 26A, 26B and 26C with respect to the wide-angle mode (f =36.00), in FIGS. 27A, 27B and 27C with respect to the middle focal length position (f=50.00), and in FIGS. 28A, 28B and 28C with respect to the telephoto mode (f=68.00), respectively.

EXAMPLE 8

| | f = 36.00 to 68.00 | | | |
|---|---|---|---|---|
| | F = 3.95 to 7.47 | | | |
| | ω = 31.00 to 17.65 | | | |
| Surface No. | R | D | Nd | νd |
| 1 | 17.046 | 2.11 | 1.56732 | 42.84 |
| 2 | 58.928 | 1.13 | | |
| 3 | −15.240 | 0.80 | 1.77250 | 49.62 |
| 4 | 193.565 | 2.09 | | |
| 5 | 394.532 | 0.80 | 1.88400 | 37.34 |
| 6 | 12.623 | 3.23 | 1.56883 | 56.04 |
| 7 | −16.964 | 0.20 | | |
| 8 | 20.424 | 2.84 | 1.48749 | 70.44 |
| 9 | −17.589 | variable | | |
| 10 | −22.596 | 2.20 | 1.76182 | 26.55 |
| 11 | −15.112 | 2.10 | | |
| 12 | −20.065 | 1.20 | 1.77250 | 49.62 |
| 13 | −73.013 | 3.35 | | |
| 14 | −10.746 | 1.30 | 1.77250 | 49.62 |
| 15 | −29.724 | | | |

-continued

| f | D9 |
|---|---|
| 36.00 | 9.44 |
| 50.00 | 6.45 |
| 68.00 | 4.42 |

| | |
|---|---|
| $f_W/f_F =$ | 1.69 |
| $f_{67}/f_W =$ | −0.36 |
| $f_6/f_7 =$ | 1.61 |
| $(f_{12} \times f_{34})/f_F^2 =$ | −1.23 |
| telephoto ratio = | 0.96 |
| width of principal ray on the last surface = | 8.50. |

Figure 31A:
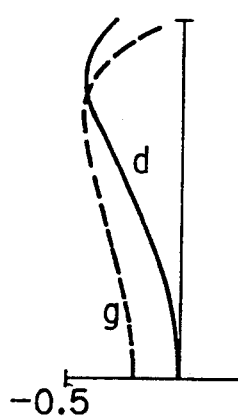
FIGS. 31A, 31B and 31C are diagrams showing various aberrations of Example 8 in a middle focal length position.
Figure 31B:
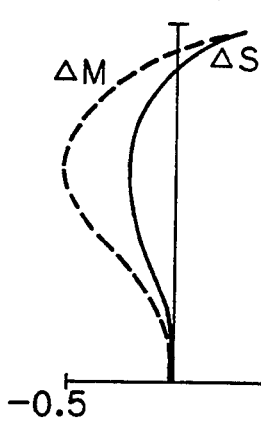
Figure 31C:
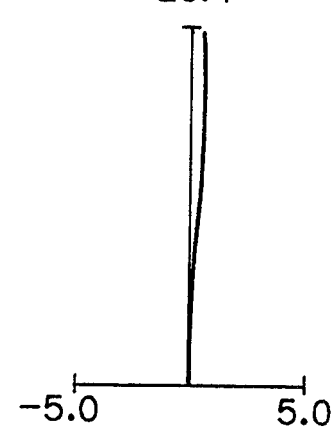
Figure 32A:
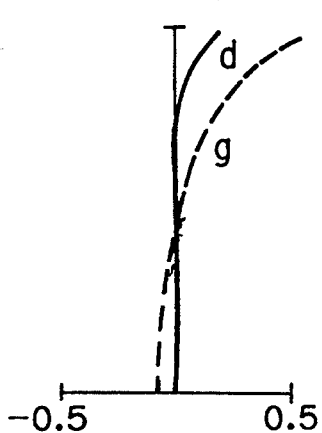
FIGS. 32A, 32B and 32C are diagrams showing various aberrations of Example 8 in the telephoto mode.
Figure 32B:
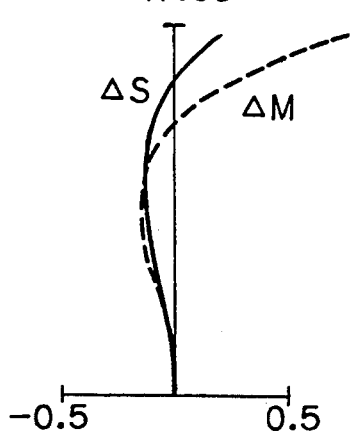
Figure 32C:
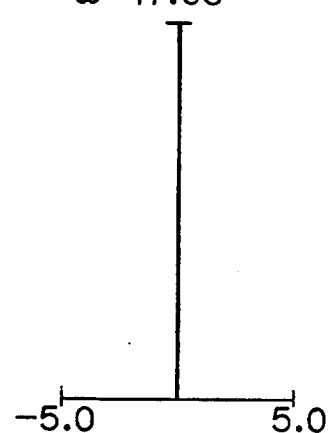

Example 8 is shown in FIG. 29, and the spherical aberration, astigmatism and distortion of Example 8 are illustrated in FIGS. 30A, 30B and 30C with respect to the wide-angle mode (f=36.00), in FIGS. 31A, 31B and 31C with respect to the middle focal length position (f=50.00), and in FIGS. 32A, 32B and 32C with respect to the telephoto mode (f=68.00), respectively.

EXAMPLE 9

| | f = 36.00 to 68.00 | | | |
|---|---|---|---|---|
| | F = 3.95 to 7.47 | | | |
| | ω = 31.00 to 17.65 | | | |
| Surface No. | R | D | Nd | νd |
| 1 | 13.604 | 2.07 | 1.54072 | 47.20 |
| 2 | 18.349 | 1.73 | | |
| 3 | −15.305 | 0.80 | 1.77250 | 49.62 |
| 4 | −63.272 | 3.48 | | |
| 5 | 29.483 | 0.80 | 1.84666 | 23.78 |
| 6 | 9.730 | 3.14 | 1.59270 | 35.45 |
| 7 | −35.517 | 0.20 | | |
| 8 | 23.645 | 2.84 | 1.51680 | 64.20 |
| 9 | −19.913 | variable | | |
| 10 | 751.802 | 3.60 | 1.80610 | 33.27 |
| 11 | −12.210 | 0.20 | | |
| 12 | −12.558 | 1.20 | 1.77250 | 49.62 |
| 13 | 80.248 | 3.71 | | |
| 14 | −10.051 | 1.30 | 1.83400 | 37.34 |
| 15 | −32.232 | | | |

| f | D9 |
|---|---|
| 36.00 | 8.3 |
| 50.00 | 5.45 |
| 68.00 | 3.5 |

| | |
|---|---|
| $f_W/f_F =$ | 1.69 |
| $f_{67}/f_W =$ | −0.19 |
| $f_6/f_7 =$ | 0.78 |
| $(f_{12} \times f_{34})/f_F^2 =$ | −1.46 |
| telephoto ratio = | 0.96 |
| width of principal ray on the last surface = | 7.55. |

Figure 33:
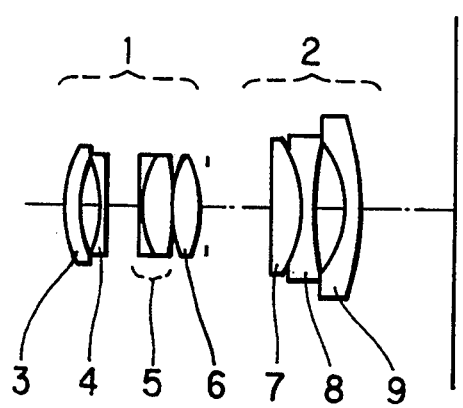
FIG. 33 is a schematic diagram showing a lens system according to Example 9 of the present invention.
Figures 34A, 34B, 34C:
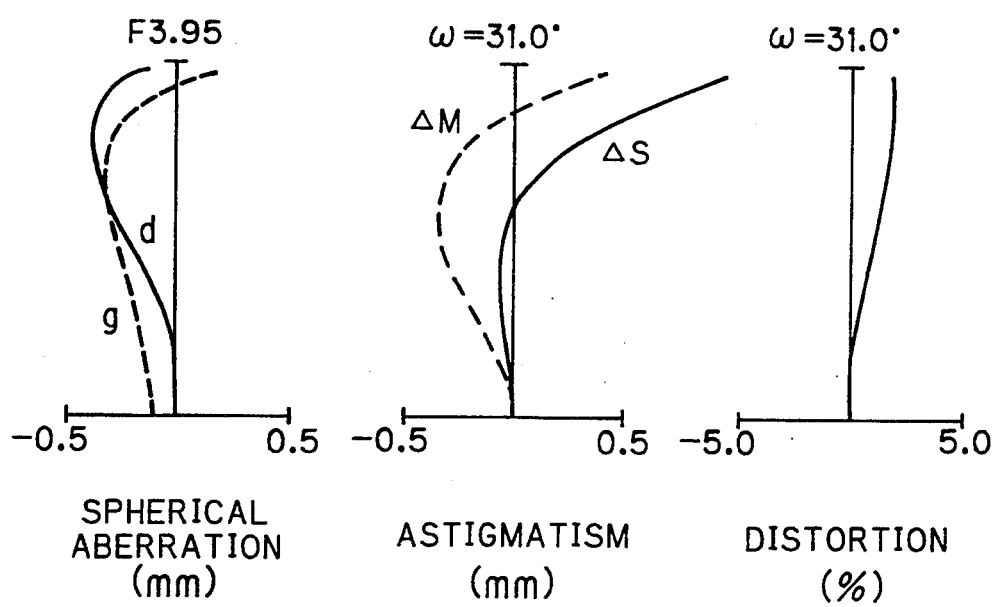
FIGS. 34A, 34B and 34C are diagrams showing various aberrations of the lens system of Example 9 in the wide-angle mode.
Figures 35A, 35B, 35C:
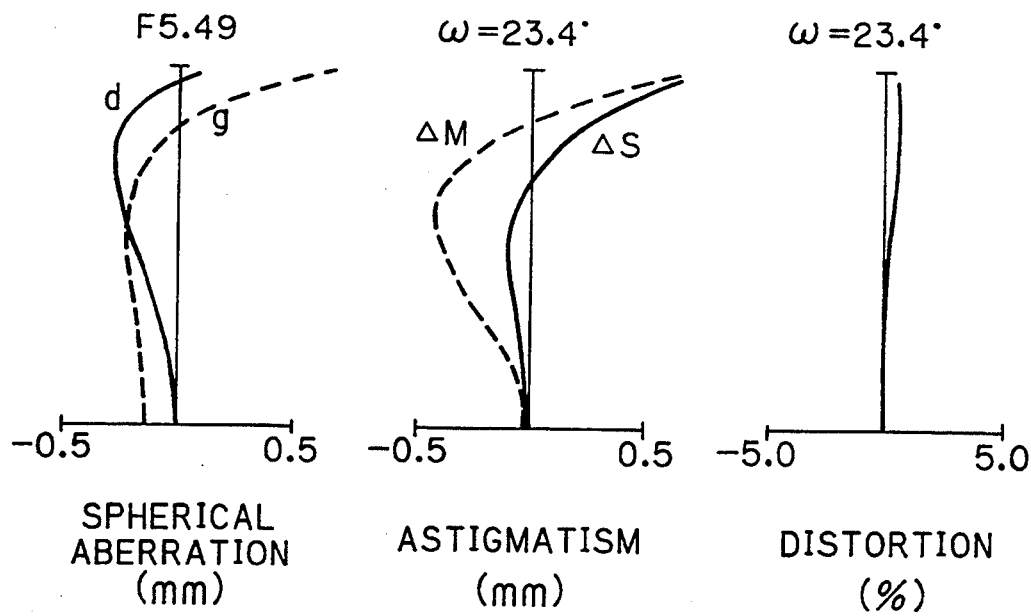
FIGS. 35A, 35B and 35C are diagrams showing various aberrations of Example 9 in a middle focal length position.
Figures 36A, 36B, 36C:
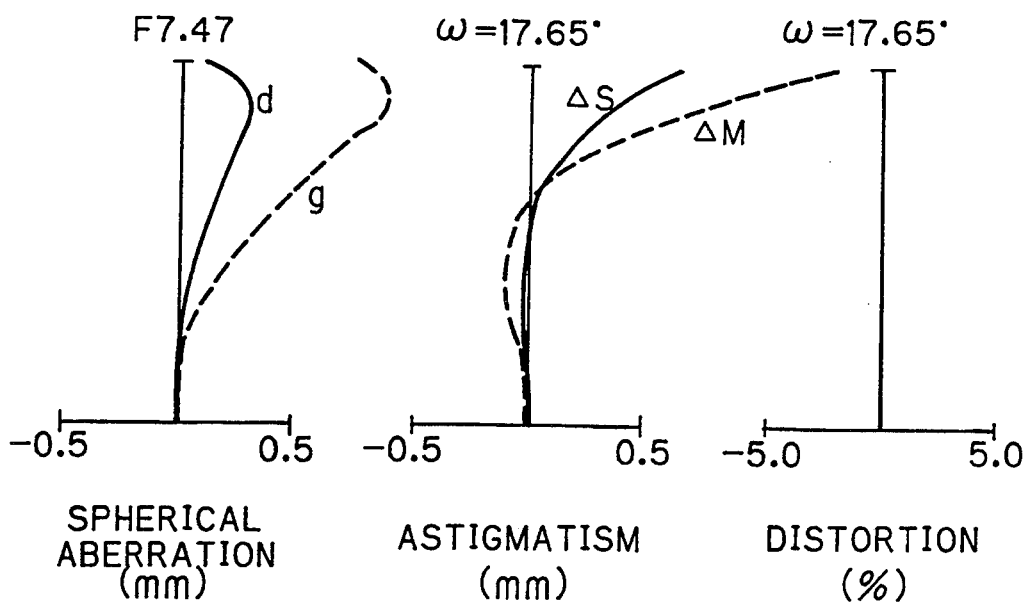
FIGS. 36A, 36B and 36C are diagrams showing various aberrations of Example 9 in the telephoto mode.

Example 9 is shown in FIG. 33, and the spherical aberration, astigmatism and distortion of Example 9 are illustrated in FIGS. 34A, 34B and 34C with respect to the wide-angle mode (f=36.00), in FIGS. 35A, 35B and 35C with respect to the middle focal length position (f=50.00), and in FIGS. 36A, 36B and 36C with respect to the telephoto mode (f=68.00), respectively.

EXAMPLE 10

| | f = 36.00 to 68.00 | | | |
|---|---|---|---|---|
| | F = 3.95 to 7.47 | | | |
| | ω = 31.00 to 17.65 | | | |
| Surface No. | R | D | Nd | νd |
| 1 | 16.809 | 2.00 | 1.59270 | 35.45 |
| 2 | 23.760 | 1.77 | | |
| 3 | −15.597 | 0.80 | 1.77250 | 49.62 |
| 4 | −61.422 | 4.09 | | |
| 5 | 30.344 | 1.95 | 1.84666 | 23.78 |
| 6 | 9.708 | 3.18 | 1.59270 | 35.45 |

-continued

| | | | | |
|---|---|---|---|---|
| 7 | −38.450 | 0.20 | | |
| 8 | 20.170 | 2.84 | 1.49700 | 81.61 |
| 9 | −20.004 | variable | | |
| 10 | 60.810 | 3.57 | 1.75520 | 27.53 |
| 11 | −13.719 | 0.20 | | |
| 12 | −15.611 | 1.20 | 1.88300 | 40.80 |
| 13 | 54.078 | 3.78 | | |
| 14 | 9.361 | 1.30 | 1.88300 | 40.80 |
| 15 | −29.383 | | | |

| f | D9 |
|---|---|
| 36.00 | 7.73 |
| 50.00 | 5.21 |
| 68.00 | 3.5 |

| | |
|---|---|
| $f_W/f_F =$ | 1.73 |
| $f_{67}/f_W =$ | −0.18 |
| $f_6/f_7 =$ | 0.85 |
| $(f_{12} \times f_{34})/f_F^2 =$ | −1.60 |
| telephoto ratio = | 0.96 |
| width of principal ray on the last surface = | 7.07. |

Figure 37:
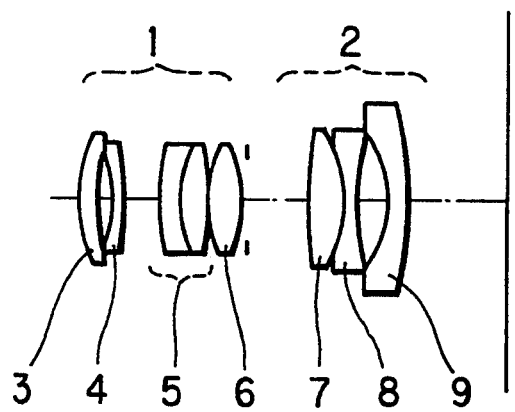
FIG. 37 is a schematic diagram showing a lens system according to Example 10 of the present invention.
Figures 38A, 38B, 38C:
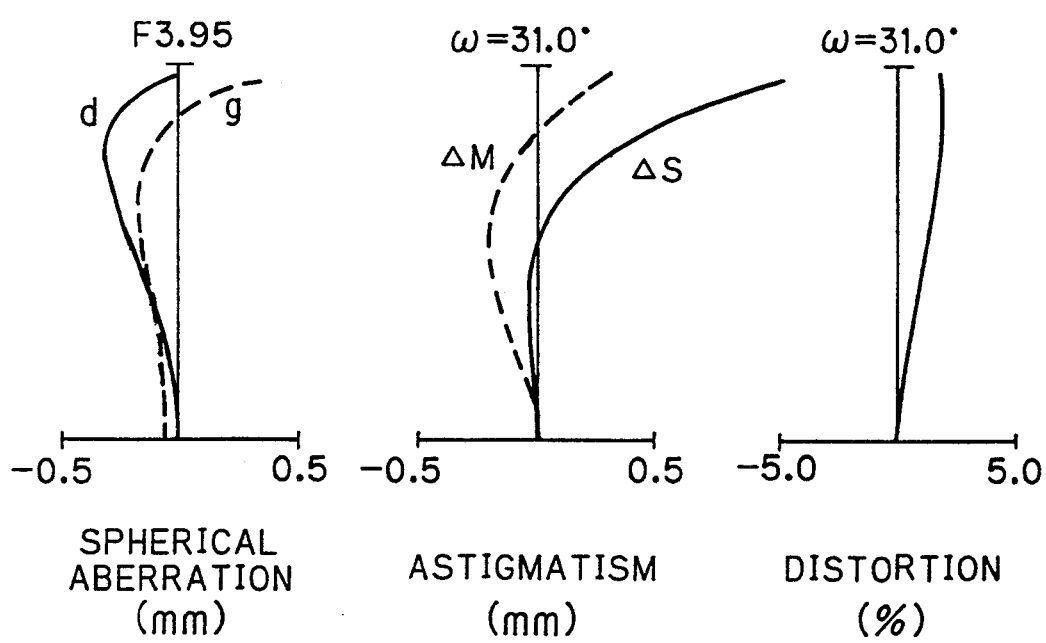
FIGS. 38A, 38B and 38C are diagrams showing various aberrations of the lens system of Example 10 in the wide-angle mode.

Example 10 is shown in FIG. 37, and the spherical aberration, astigmatism and distortion of Example 10 are illustrated in FIGS. 38A, 38B and 38C with respect to the wide-angle mode (f=36.00), in FIGS. 39A, 39B and 39C with respect to the middle focal length position (f=50.00), and in FIGS. 40A, 40B and 40C with respect to the telephoto mode (f=68.00), respectively.

EXAMPLE 11 f = 36.00 to 68.00
F = 3.95 to 7.47
ω = 31.00 to 17.65

| Surface No. | R | D | Nd | νd |
|---|---|---|---|---|
| 1 | 23.549 | 2.25 | 1.62004 | 36.30 |
| 2 | 299.111 | 1.07 | | |
| 3 | −18.463 | 0.80 | 1.83400 | 37.34 |
| 4 | −498.280 | 4.45 | | |
| 5 | −122.271 | 3.13 | 1.48749 | 70.34 |
| 6 | −7.920 | 0.80 | 1.83400 | 37.34 |
| 7 | −11.173 | 0.20 | | |
| 8 | 21.835 | 2.84 | 1.48749 | 70.44 |
| 9 | −83.739 | variable | | |
| 10 | −552.789 | 3.37 | 1.59270 | 35.45 |
| 11 | −14.264 | 0.96 | | |
| 12 | −14.575 | 1.20 | 1.77250 | 49.62 |
| 13 | 3683.900 | 3.48 | | |
| 14 | −11.523 | 1.30 | 1.77250 | 49.62 |
| 15 | −35.023 | | | |

| f | D9 |
|---|---|
| 36.00 | 8.84 |
| 50.00 | 5.66 |
| 68.00 | 3.5 |

| | |
|---|---|
| $f_W/f_F =$ | 1.61 |
| $f_{67}/f_W =$ | −0.26 |
| $f_6/f_7 =$ | 0.82 |
| $(f_{12} \times f_{34})/f_F^2 =$ | −2.13 |
| telephoto ratio = | 0.96 |
| width of principal ray on the last surface = | 8.32. |

Figure 43A:
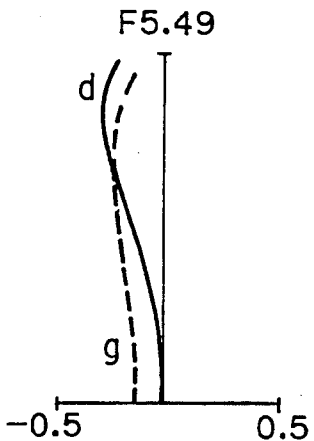
FIGS. 43A, 43B and 43C are diagrams showing various aberrations of Example 11 in a middle focal length position.
Figure 43B:
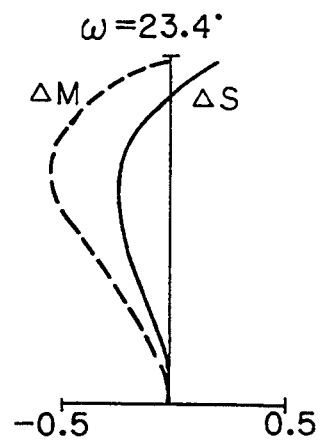
Figure 43C:
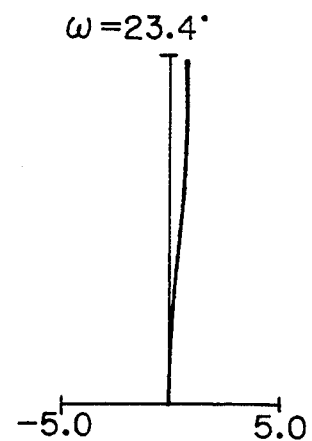
Figure 44A:
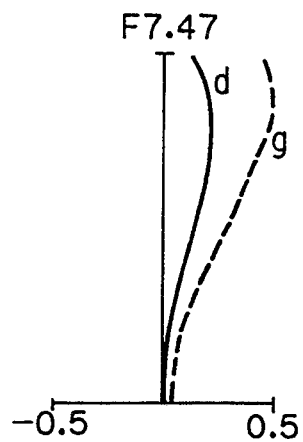
FIGS. 44A, 44B and 44C are diagrams showing various aberrations of Example 11 in the telephoto mode.
Figure 44B:
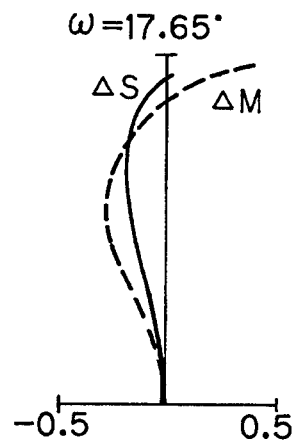
Figure 44C:
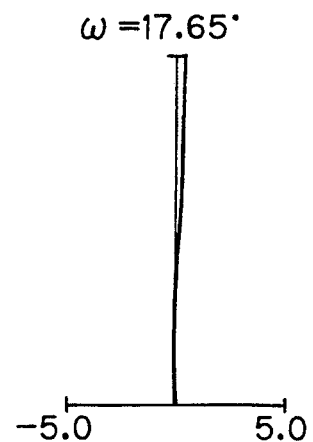

Example 11 is shown in FIG. 41, and the spherical aberration, astigmatism and distortion of Example 11 are illustrated in FIGS. 42A, 42B and 42C with respect to the wide-angle mode (f=36.00), in FIGS. 43A, 43B and 43C with respect to the middle focal length position (f=50.00), and in FIGS. 44A, 44B and 44C with respect to the telephoto mode (f=68.00), respectively.

EXAMPLE 12 f = 36.00 to 68.00
F = 3.95 to 7.47
ω = 31.00 to 17.65

| Surface No. | R | D | Nd | νd |
|---|---|---|---|---|
| 1 | 23.152 | 2.19 | 1.51742 | 52.15 |
| 2 | 152.379 | 1.18 | | |
| 3 | −16.512 | 0.80 | 1.80420 | 47.20 |
| 4 | −89.189 | 4.34 | | |
| 5 | −875.652 | 2.84 | 1.54072 | 47.20 |
| 6 | −9.941 | 0.25 | | |
| 7 | −9.493 | 0.80 | 1.84666 | 23.78 |
| 8 | −13.770 | 0.20 | | |
| 9 | 29.827 | 2.84 | 1.48749 | 70.44 |
| 10 | −32.265 | variable | | |
| 11 | −308.100 | 3.16 | 1.59270 | 35.45 |
| 12 | −15.487 | 1.26 | | |
| 13 | −15.922 | 1.20 | 1.77250 | 49.62 |
| 14 | 429.026 | 3.56 | | |
| 15 | −11.486 | 1.30 | 1.77250 | 49.62 |
| 16 | −33.383 | | | |

| f | D9 |
|---|---|
| 36.00 | 8.88 |
| 50.00 | 5.70 |
| 68.00 | 3.53 |

| | |
|---|---|
| $f_W/f_F =$ | 1.61 |
| $f_{67}/f_W =$ | −0.27 |
| $f_6/f_7 =$ | 0.85 |
| $(f_{12} \times f_{34})/f_F^2 =$ | −1.89 |
| telephoto ratio = | 0.96 |
| width of principal ray on the last surface = | 8.34. |

Figure 45:
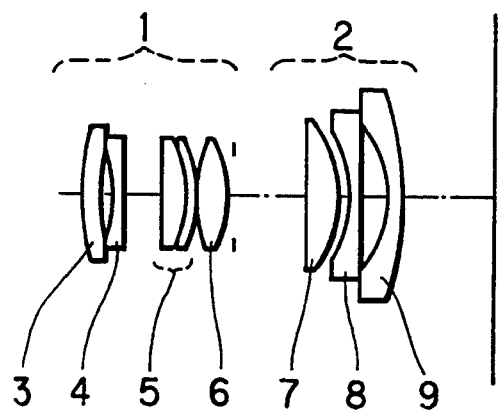
FIG. 45 is a schematic diagram showing a lens system according to Example 12 of the present invention.
Figures 46A, 46B, 46C:
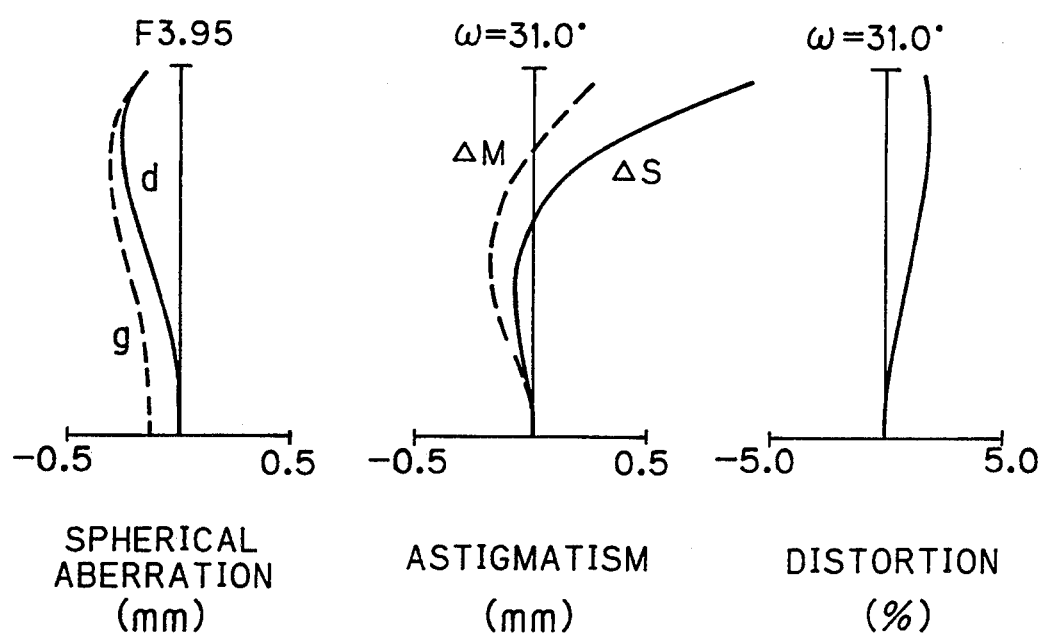
FIGS. 46A, 46B and 46C are diagrams showing various aberrations of the lens system of Example 12 in the wide-angle mode.
Figure 53:
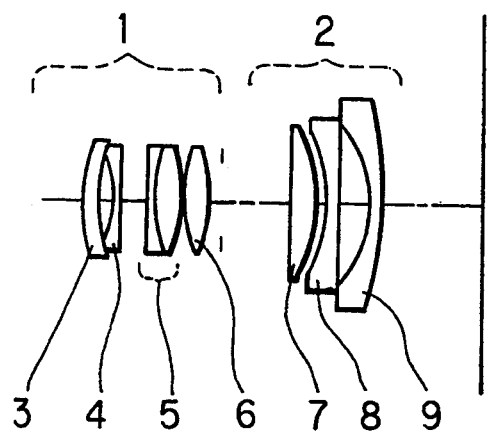
FIG. 53 is a schematic diagram showing a lens system according to Example 14 of the present invention.
Figure 54A:
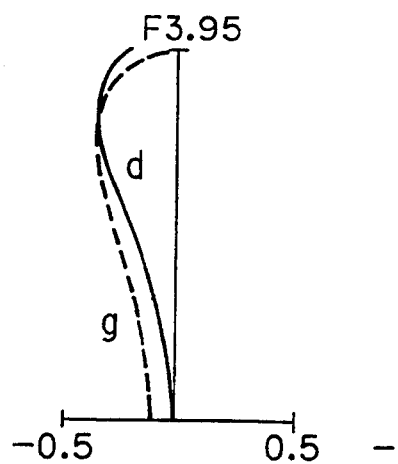
FIGS. 54A, 54B and 54C are diagrams showing various aberrations of the lens system of Example 14 in the wide-angle mode.
Figure 54B:
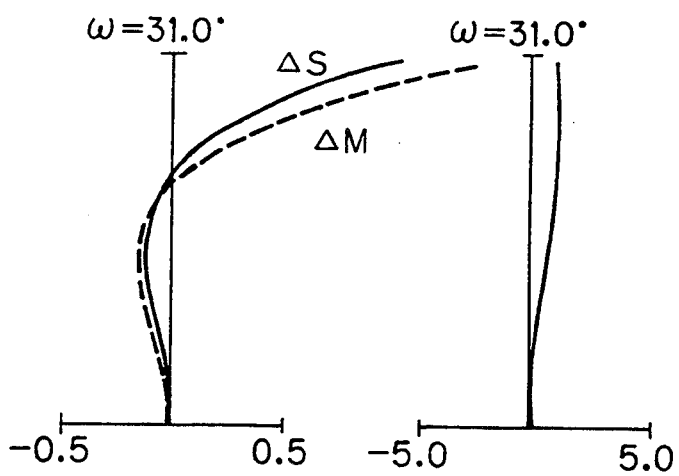
Figure 54C:
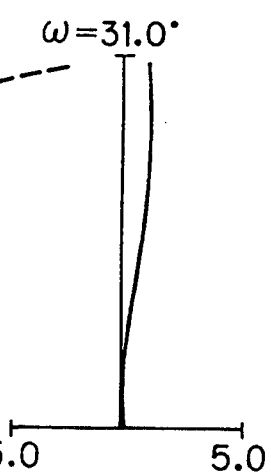

Example 12 is shown in FIG. 45, and the spherical aberration, astigmatism and distortion of Example 12 are illustrated in FIGS. 46A, 46B and 46C with respect to the wide-angle mode (f=36.00), in FIGS. 47A, 47B and 47C with respect to the middle focal length position (f=50.00), and in FIGS. 48A, 48B and 48C with respect to the telephoto mode (f=68.00), respectively.

EXAMPLE 13 f = 36.00 to 68.00
F = 3.95 to 7.47
ω = 31.00 to 17.65

| Surface No. | R | D | Nd | νd |
|---|---|---|---|---|
| 1 | 15.924 | 2.11 | 1.60342 | 38.01 |
| 2 | 40.387 | 1.18 | | |
| 3 | −15.748 | 1.76 | 1.80610 | 40.73 |
| 4 | −4562.28 | 1.50 | | |
| 5 | 45.748 | 0.81 | 1.80518 | 25.46 |
| 6 | 18.014 | 0.60 | | |
| 7 | 35.928 | 2.46 | 1.53172 | 48.84 |
| 8 | −19.137 | 0.20 | | |
| 9 | 24.738 | 2.70 | 1.48749 | 70.44 |
| 10 | −17.738 | variable | | |
| 11 | −507.013 | 3.42 | 1.59270 | 35.45 |
| 12 | −14.573 | 0.75 | | |
| 13 | −16.300 | 1.20 | 1.77250 | 49.62 |
| 14 | −1203.94 | 3.49 | | |
| 15 | −11.486 | 1.30 | 1.77250 | 49.62 |
| 16 | −37.736 | | | |

| f | D9 |
|---|---|
| 36.00 | 9.23 |
| 50.00 | 5.82 |
| 68.00 | 3.5 |

| | |
|---|---|
| $f_W/f_F =$ | 1.60 |
| $f_{67}/f_W =$ | −0.28 |
| $f_6/f_7 =$ | 0.98 |
| $(f_{12} \times f_{34})/f_F^2 =$ | −1.34 |
| telephoto ratio = | 0.96 |
| width of principal ray on the last surface = | 8.29. |

Example 13 is shown in FIG. 49, and the spherical aberration, astigmatism and distortion of Example 13 are illustrated in FIGS. 50A, 50B and 50C with respect to the wide-angle mode (f=36.00), in FIGS. 51A, 51B and 51C with respect to the middle focal length position (f=50.00), and in FIGS. 52A, 52B and 52C with respect to the telephoto mode (f=68.00), respectively.

EXAMPLE 14

| | f = 36.00 to 68.00<br>F = 3.95 to 7.47<br>ω = 31.00 to 17.65 | | | |
|---|---|---|---|---|
| Surface No. | R | D | Nd | νd |
| 1 | 17.512 | 2.01 | 1.67003 | 47.20 |
| 2 | 36.749 | 1.24 | | |
| 3 | −15.553 | 0.80 | 1.77250 | 49.62 |
| 4 | −162.024 | 2.64 | | |
| 5 | 127.534 | 0.80 | 1.83400 | 37.34 |
| 6 | 11.260 | 3.16 | 1.56883 | 56.04 |
| 7 | −21.888 | 0.20 | | |
| 8 | 22.254 | 2.81 | 1.51680 | 64.20 |
| 9 | −17.323 | variable | | |
| 10 | −123.337 | 3.31 | 1.59270 | 35.45 |
| 11 | −14.009 | 0.96 | | |
| 12 | −14.678 | 1.20 | 1.77250 | 49.62 |
| 13 | −218.054 | 3.36 | | |
| 14 | −11.531 | 1.30 | 1.77250 | 49.62 |
| 15 | −36.872 | | | |

| f | D9 |
|---|---|
| 36.00 | 8.71 |
| 50.00 | 5.70 |
| 68.00 | 3.64 |
| $f_W/f_F =$ | 1.68 |
| $f_{67}/f_W =$ | −0.27 |
| $f_6/f_7 =$ | 0.92 |
| $(f_{12} \times f_{34})/f_F^2 =$ | −1.67 |
| telephoto ratio = | 0.96 |
| width of principal ray on the last surface = | 8.01. |

For the purpose of comparison, numerical values of an embodiment of the above-mentioned Japanese Appln. 63-161422 and those of an embodiment of the above-mentioned Japanese Appln. 2-284109 will be described below as Prior Arts I and II. Although the vitreous material refractive index of the fourteenth surface of the Prior Art I is not obvious, a value derived from the focal length is shown as the data therefor.

PRIOR ART I

| | f = 36.00 to 68.46<br>F = 3.8 to 4.8<br>ω = 27.9 to 17.5 | | | |
|---|---|---|---|---|
| Surface No. | R | D | Nd | νd |
| 1 | 20.697 | 2.50 | 1.65844 | 50.90 |
| 2 | 59.828 | 2.00 | | |
| 3 | −28.495 | 2.50 | 1.83400 | 37.20 |
| 4 | 28.332 | 0.70 | | |
| 5 | 48.125 | 4.55 | 1.80518 | 25.40 |
| 6 | 21.419 | 7.10 | 1.80610 | 40.90 |
| 7 | −25.109 | 0.20 | | |
| 8 | 41.523 | 2.00 | 1.58913 | 61.00 |
| 9 | 225.907 | variable | | |
| 10 | −123.128 | 2.40 | 1.79952 | 42.20 |
| 11 | −25.427 | 0.10 | | |
| 12 | −49.227 | 1.50 | 1.78590 | 44.20 |
| 13 | 141.008 | 5.00 | | |
| 14 | −15.852 | 1.20 | 1.77250 | 49.62 |
| 15 | −37.004 | | | |

| f | D9 |
|---|---|
| 41.35 | 19.185 |
| 49.55 | 13.255 |
| 68.45 | 5.000 |
| $f_W/f_F =$ | 1.21 |

-continued

| $f_{67}/f_W =$ | −0.47 |
|---|---|
| $f_6/f_7 =$ | 1.26 |
| $(f_{12} \times f_{34})/f_F^2 =$ | −0.47 |
| telephoto ratio = | 1.16 |
| width of principal ray on the last surface = | 12.08. |

PRIOR ART II

| | f = 29.02 to 54.85<br>F = 3.8 to 6.6<br>ω = 36.7 to 21.52 | | | |
|---|---|---|---|---|
| Surface No. | R | D | Nd | νd |
| 1 | 21.639 | 2.60 | 1.59270 | 35.30 |
| 2 | 48.912 | 2.80 | | |
| 3 | −22.037 | 0.80 | 1.83400 | 37.20 |
| 4 | 55.905 | 3.00 | | |
| 5 | 23.832 | 4.50 | 1.80610 | 40.90 |
| 6 | 9.950 | 4.10 | 1.61272 | 58.70 |
| 7 | −44.581 | 0.10 | | |
| 8 | 29.104 | 2.50 | 1.61272 | 58.70 |
| 9 | −29.104 | variable | | |
| 10 | −39.664 | 3.00 | 1.54814 | 45.80 |
| 11 | −20.129 | 0.50 | | |
| 12 | −66.333 | 0.80 | 1.71300 | 53.90 |
| 13 | 255.812 | 6.30 | | |
| 14 | −12.297 | 1.00 | 1.71300 | 53.90 |
| 15 | −42.017 | | | |

| f | D9 |
|---|---|
| 29.02 | 13.17 |
| 39.80 | 7.55 |
| 54.85 | 3.40 |
| $f_W/f_F =$ | 1.18 |
| $f_{67}/f_W =$ | −0.60 |
| $f_6/f_7 =$ | 2.98 |
| $(f_{12} \times f_{34})/f_F^2 =$ | −0.81 |
| telephoto ratio = | 1.18 |
| width of principal ray on the last surface = | 13.00. |

As described so far, the zoom lens system of the present invention has a zoom ratio of about 2 and a telephoto ratio less than 1 in the telephoto mode, while various aberration are properly corrected. Moreover, since the effective aperture of the last lens can be small, and the lens barrel can be small in diameter and length as well. Therefore, the zoom lens system of the present invention is the most suitable yet devised for compact or thin lens-shutter cameras.

As a focusing method for the zoom lens system of the present invention, any of three methods is possible: focusing by moving the forward lens group, by moving the rearward lens group, or by moving both lens groups. However, it is preferable for shortening the overall length of the lens barrel to adopt as a focusing method, a method wherein the rearward lens group moves. In this case, the nearest focusing distance in the wide-angle mode tends to be greater than that in the telephoto mode because of the restriction on the amount of movement of the rearward lens group. However, the nearest focusing distance can be shortened by designing the zoom lens system to be focused by moving all the lenses, particularly in the near range of the wide-angle mode.

Although all the lenses of the zoom lens system are spherical lenses in the above-described examples, it is needless to say that the compactness and the performance of the zoom lens system may be further improved by using some aspherical optical surfaces in the zoom lens system. It may be possible to compose the individual lens means from a plurality of lenses.

What is claimed is:

1. A zoom lens system having a shortened overall length and consisting of: a forward lens group of a positive power and a rearward lens group of a negative power arranged in this order from the object side, the magnification of said zoom lens system being changed by changing the spacing between said forward lens group and said rearward lens group, said forward lens group comprising first lens means of a positive power with a highly convex surface directed to the object, second lens means of a negative power, third lens means including at least a negative lens and a positive lens and having a positive power as a whole, and fourth lens means of positive power, arranged in this order from the object side, said rearward lens group comprising fifth lens means of a positive power with a highly convex surface directed to the image surface side, sixth lens means of a negative power, and seventh lens means of a negative power with a highly concave surface directed to the object, arranged in this order from the object side, said zoom lens system satisfying the following conditions:

$1.40 < f_w/f_F < 2.0$ (1)

$Np < Nn$ (2)

$-0.45 < f_{67}/f_w < -0.1$ (3)

$0.5 < f_6/f_7 < 0.8$ (4)

wherein $f_F$ is the focal length of said forward lens group, $f_w$ is the focal length of said zoom lens system in the wide-angle mode, Np is the index of refraction of said positive lens of the third lens means, Nn is the index of refraction of said negative lens of the third lens means, $f_6$ is the focal length of the sixth lens means, $f_7$ is the focal length of the seventh lens means, and $f_{67}$ is the resultant focal length of the sixth and seventh lens means.

2. A zoom lens system as claimed in claim 1, further satisfying the following condition:

$-3 < (f_{12} \times f_{34})/f_F^2 < -0.5$ (5)

wherein $f_{12}$ is the resultant focal length of the first and second lens means, and $f_{34}$ is the resultant focal length of the third and fourth lens means.

3. A zoom lens system as claimed in claim 2, further satisfying the following condition:

$vp > vn$ wherein $vp$ and $vn$ are the Abbe numbers of said positive lens and said negative lens of said third lens means.

4. A zoom lens system having a shortened overall length and consisting of: a forward lens group of a positive power and a rearward lens group of a negative power arranged in this order from the object side, the magnification of said zoom lens system being changed by changing the spacing between said forward lens group and said rearward lens group, said forward lens group comprising first lens means of a positive power with a highly convex surface directed to the object, a second lens of a negative power, third lens means including at least a negative lens and a positive lens and having a positive power as a whole, and fourth lens means of positive power, arranged in this order from the object side, said rearward lens group comprising fifth lens means of a positive power with a highly convex surface directed to the image surface side, sixth lens means of a negative power, and seventh lens means of a negative power with a highly concave surface directed to the object, arranged in this order from the object side, said zoom lens system satisfying the following conditions:

$1.40 < f_w/f_F < 2.0$ (1)

$Np < Nn$ (2)

$-0.45 < f_{67}/f_w < -0.1$ (3)

$0.5 < f_6/f_7 < 0.8$ (4)

wherein $f_F$ is the focal length of said forward lens group, $f_w$ is the focal length of said zoom lens system in the wide-angle mode, Np is the index of refraction of said positive lens of the third lens means, Nn is the index of refraction of said negative lens of the third lens means, $f_6$ is the focal length of the sixth lens means, $f_7$ is the focal length of the seventh lens means, and $f_{67}$ is the resultant focal length of the sixth and seventh lens means.

* * * * *